(12) United States Patent
Tawaraishi et al.

(10) Patent No.: US 8,717,377 B2
(45) Date of Patent: May 6, 2014

(54) COMPUTER-READABLE STORAGE MEDIUM HAVING STORED THEREIN IMAGE PROCESSING PROGRAM AND IMAGE PROCESSING APPARATUS

(75) Inventors: Yasuki Tawaraishi, Kyoto (JP); Yusuke Kurahashi, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1129 days.

(21) Appl. No.: 11/892,502

(22) Filed: Aug. 23, 2007

(65) Prior Publication Data

US 2008/0316207 A1    Dec. 25, 2008

(30) Foreign Application Priority Data

Jun. 22, 2007 (JP) ................................. 2007-165613

(51) Int. Cl.
*G09G 5/00* (2006.01)

(52) U.S. Cl.
USPC ........... 345/582; 345/420; 345/428; 345/552; 345/588; 345/629; 345/581; 382/154; 382/176; 382/229; 382/285; 382/293

(58) Field of Classification Search
USPC .......... 345/419–619; 382/154, 176, 229, 285, 382/293
See application file for complete search history.

(56) References Cited

U.S. PATENT DOCUMENTS

| | | | |
|---|---|---|---|
| 5,953,015 A * | 9/1999 | Choi | 345/428 |
| 5,987,567 A * | 11/1999 | Rivard et al. | 345/552 |
| 6,057,861 A * | 5/2000 | Lee et al. | 345/569 |
| 6,121,977 A * | 9/2000 | Arai et al. | 345/619 |
| 6,239,807 B1 * | 5/2001 | Bossut | 345/582 |
| 6,828,973 B2 * | 12/2004 | Fery | 345/473 |
| 6,906,715 B1 * | 6/2005 | Dunn | 345/421 |
| 7,002,591 B1 | 2/2006 | Leather et al. | |
| 7,136,069 B1 * | 11/2006 | Dawson | 345/582 |
| 7,184,051 B1 * | 2/2007 | Matsumoto et al. | 345/581 |
| 7,399,220 B2 * | 7/2008 | Kriesel et al. | 452/157 |
| 7,460,118 B2 * | 12/2008 | Hayakawa | 345/419 |
| 2003/0117402 A1 * | 6/2003 | Hubrecht et al. | 345/473 |
| 2005/0243088 A1 * | 11/2005 | Lengyel | 345/420 |
| 2006/0055711 A1 | 3/2006 | Hayakawa | |
| 2006/0066608 A1 * | 3/2006 | Appolloni | 345/419 |
| 2006/0267978 A1 * | 11/2006 | Litke et al. | 345/419 |

FOREIGN PATENT DOCUMENTS

| | | |
|---|---|---|
| JP | 2004-54634 A | 2/2004 |
| JP | 2006-072577 | 3/2006 |

OTHER PUBLICATIONS

Bakay et al. "Real Time Animated Grass", Eurographics, Cambridge, Great Britain, Mar. 25, 2002, 7 pages.
Lengyel et al., "Real-Time Fur Over Arbitrary Surfaces", Proceedings on the Symposium on Interactive 3D Graphics, New York, NY, ACM, US, Mar. 19, 2001, pp. 227-232.

* cited by examiner

*Primary Examiner* — Abderrahim Merouan
(74) *Attorney, Agent, or Firm* — Nixon & Vanderhye P.C.

(57) ABSTRACT

A shell texture image shared for use among multilayer shell polygons and including a plurality of areas having transparency different from one another, is distorted to varying degrees depending on a position of each layer of the shell polygons, so as to texture-map each layer of the shell polygons therewith and so as to position the multilayer shell polygons in a virtual three-dimensional space. Thus, it is possible to realistically represent hair, grass, and the like with little effort in three-dimensional image processing.

13 Claims, 19 Drawing Sheets

SHELL POLYGON (3RD LAYER)
SHELL POLYGON (2ND LAYER)
SHELL POLYGON (1ST LAYER)
BASE POLYGON

| SHELL TEXTURE IMAGE ||
|---|---|
| ALPHA VALUE | COLOR VALUE |
|  |  |

SHELL TEXTURE IMAGE

SHELL POLYGONS
(1ST – 8TH LAYERS)

BASE POLYGON

| DISTORTION MAP ||
|---|---|
| HORIZONTAL DISTORTION MAP | VERTICAL DISTORTION MAP |
|  |  |

SHELL TEXTURE IMAGE

COMPUTER-READABLE STORAGE MEDIUM HAVING STORED THEREIN IMAGE PROCESSING PROGRAM AND IMAGE PROCESSING APPARATUS

CROSS REFERENCE TO RELATED APPLICATION

The disclosure of Japanese Patent Application No. 2007-165613, filed on Jun. 22, 2007, is incorporated herein by reference.

BACKGROUND

1. Field of the Invention

The present technology relates to a computer-readable storage medium having stored therein an image processing program and an image processing apparatus, and particularly to a computer-readable storage medium having stored therein an image processing program and an image processing apparatus, which are used for texture-mapping a three-dimensional polygonal model.

2. Description of the Background Art

Conventionally, in order to represent hair, grass, and the like in a simulated manner in three-dimensional image processing, a method is employed for texture-mapping multilayer semi-transparent polygons (shell polygons) with texture images representing sections of hairs, sections of grass blades, and the like. In Japanese Laid-Open Patent Publication No. 2006-072577, a lawn is drawn using the above-described method.

However, it requires a great deal of effort to individually prepare a texture image for each layer of the multilayer shell polygons, in which case it is also difficult to edit the texture image. Alternatively, it is conceivable that all of the multilayer shell polygons may be texture-mapped with the same texture image. However, merely using the same texture image results in lack of representational power, and therefore cannot represent the detailed appearance of hair and the detailed appearance of a hair bundle.

SUMMARY

Therefore, a feature of the example embodiment presented herein is to provide a computer-readable storage medium having stored therein an image processing program and an image processing apparatus, which are capable of realistically representing hair, grass, and the like with little effort in three-dimensional image processing.

The present example embodiment has the following features to attain the above. Note that the reference numerals and the figure numbers in parentheses indicate an example of the correspondence with the drawings in order to aid in understanding the present example embodiment and are not intended to limit the scope of the present example embodiment in any way.

The computer-readable storage medium according to the present example embodiment is a storage medium having stored therein an image processing program (30) for texture-mapping a three-dimensional polygonal model. The image processing program causes a computer (10, 11b) to execute: a shell polygon reading step of reading, from storage means, multilayer polygon data (33) for constructing multilayer shell polygons including multiple layers of polygonal models; a texture reading step (S25) of reading, from the storage means, a shell texture image (FIG. 9, 35) which is shared for use among the multilayer shell polygons and includes a plurality of areas having transparency different from one another; and a texture mapping step (S27, S29, S30) of texture-mapping each layer of the shell polygons with the shell texture image distorted to varying degrees depending on a position of each layer of the shell polygons, so as to position each layer.

Note that in the texture mapping step, the further outside the layer of the shell polygon is, the more distorted the shell texture image is.

Further, in the texture mapping step, each layer of the shell polygons may be texture-mapped with the shell texture image distorted by referring to a value of a point shifted from a point to be originally referred to in the shell texture image (FIG. 15).

Further, the image processing program may further cause the computer to execute a step (S26) of reading a distortion map (FIG. 13, 36) indicating a distortion amount of each point of the shell texture image. And in the texture mapping step, a distortion amount of each layer of the shell polygons may be calculated from the distortion amount indicated by the distortion map, so as to determine, based on the calculation result, the point to be referred to in the shell texture image.

Further, the distortion map may include a horizontal distortion map indicating a distortion amount of the shell texture image in a horizontal direction and also include a vertical distortion map indicating a distortion amount of the shell texture image in a vertical direction (FIG. 13).

Further, the image processing program may further cause the computer to execute a step of reading, from the storage means, base polygon data (31) for constructing a base polygon to be a base for positioning the multilayer shell polygons, and also to execute a step (S23) of positioning the base polygon based on the read base polygon data. And in the texture mapping step, based on a distance between the base polygon and each layer of the shell polygons, the distortion amount of each layer of the shell polygons may be calculated from the distortion amount indicated by the distortion map, so as to position the multilayer shell polygons outside the base polygon (FIG. 17).

Further, in the texture mapping step, based on sequential order, starting from an innermost layer, in which the shell polygons are positioned, the distortion amount of each layer of the shell polygons may be calculated from the distortion amount indicated by the distortion map.

Further, in the texture mapping step, the distortion amount of each layer of the shell polygons may be further changed with respect to a unit of time.

Further, the image processing program may further cause the computer to execute a step of reading, from the storage means, base polygon data (31) for constructing a base polygon to be a base for positioning the multilayer shell polygons, and also to execute a step (S23) of positioning the base polygon based on the read base polygon data. And in the texture mapping step, the multilayer shell polygons may be positioned outside the base polygon.

Further, the image processing program may further cause the computer to execute a step (S22) of texture-mapping the base polygon with a base texture image (32) used for the base polygon.

Further, in the texture mapping step, the further outside the layer of the shell polygon is, the greater the transparency of the shell texture image to be used for texture-mapping the shell polygon is (S28, S29).

Further, the image processing program may further cause the computer to execute a step of generating, based on the base polygon data, new vertices by shifting vertices of the base polygon by predetermined distances in normal vector directions, so as to generate the multilayer polygon data based on the generated vertices.

Further, in the texture mapping step, the multilayer shell polygons may be positioned based on the multilayer polygon data (33) prepared in advance.

The image processing apparatus according to the present example embodiment is an image processing apparatus (3) for texture-mapping a three-dimensional polygonal model.

The image processing apparatus includes: shell polygon reading means (10, 11*b*) for reading, from storage means, multilayer polygon data (33) for constructing multilayer shell polygons including multiple layers of polygonal models; texture reading means (10, 11*b*) for reading, from the storage means, a shell texture image (FIG. 9,35) which is shared for use among the multilayer shell polygons and includes a plurality of areas having transparency different from one another; and texture mapping means (10, 11*b*) for texture-mapping each layer of the shell polygons with the shell texture image distorted to varying degrees depending on a position of each layer of the shell polygons, so as to position each layer.

Note that by the texture mapping means, the further outside the layer of the shell polygon is, the more distorted the shell texture image is.

Further, the texture mapping means may texture-map each layer of the shell polygons with the shell texture image distorted by referring to a value of a point shifted from a point to be originally referred to in the shell texture image (FIG. 15).

Further, the image processing apparatus may further include means (10, 11*b*) for reading a distortion map (FIG. 13, 36) indicating a distortion amount of each point of the shell texture image. And the texture mapping means may calculate a distortion amount of each layer of the shell polygons from the distortion amount indicated by the distortion map, so as to determine, based on the calculation result, the point to be referred to in the shell texture image.

According to the present example embodiment, a shell texture image shared for use among multilayer shell polygons is distorted to varying degrees depending on a position of each layer of the shell polygons, so as to texture-map each layer of the shell polygons therewith. Thus it is possible to display, on the shell polygons, textures different from one another without individually preparing a shell texture image for each layer of the shell polygons.

These and other features, aspects and advantages of the present example embodiment will become more apparent from the following detailed description of the present example embodiment when taken in conjunction with the accompanying drawings.

DESCRIPTION OF THE PREFERRED EMBODIMENTS (Overall structure of the game system)

Figure 1:
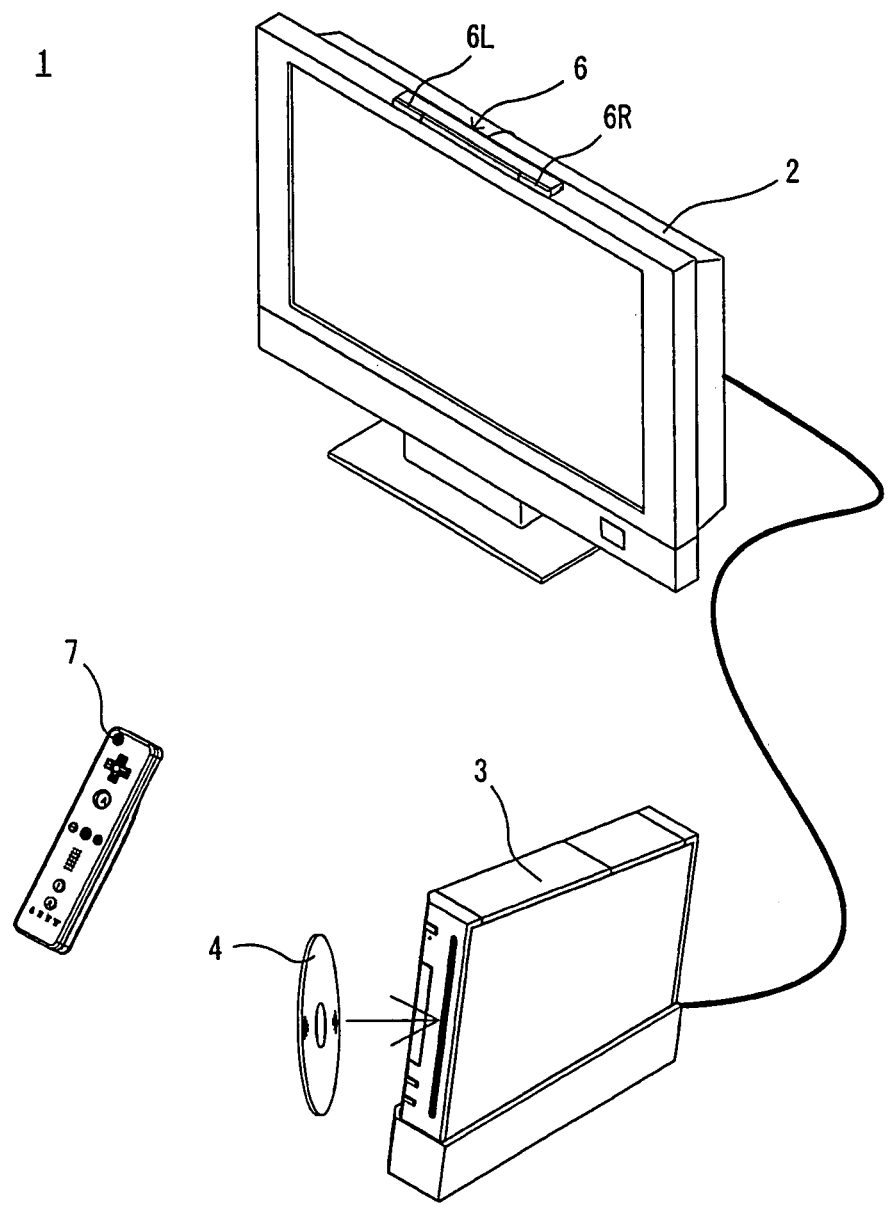
FIG. 1 is an external view of a game system 1 according to an embodiment.

With reference to FIG. 1, a game system 1 including a game apparatus according to an embodiment will be described. FIG. 1 is an external view of the game system 1. Hereinafter, a game apparatus and a game program according to the present embodiment will be described. In the following example, the game apparatus is a stationary game apparatus. As shown in FIG. 1, the game system 1 includes a TV receiver (hereinafter referred to simply as a "TV") 2, a game apparatus 3, an optical disc 4, a marker section 6, and a controller 7. In the game system 1, game processing is executed by the game apparatus 3 based on a game operation performed using the controller 7.

In the game apparatus 3, the optical disc 4 is detachably mountable as an exemplary information storage medium exchangeably usable for the game apparatus 3. The optical disc 4 has stored therein the game program to be executed by the game apparatus 3. The game apparatus 3 has an insertion opening on the front surface thereof for mounting the optical disc 4. The game apparatus 3 reads and executes the game program stored in the optical disc 4 inserted into the insertion opening, and thus performs the game processing.

The game apparatus 3 is connected to the TV 2 as an exemplary display device via a connection cord. The TV 2 displays a game image obtained as a result of the game processing executed by the game apparatus 3. Further, the marker section 6 is provided in the vicinity of a display screen of the TV 2 (above the display screen in FIG. 1). The marker section 6 includes two markers 6R and 6L respectively at two ends thereof. Specifically, the marker 6R (also the marker 6L) includes one or more infrared LEDs, and outputs infrared light forward from the TV 2. The marker section 6 is connected to the game apparatus 3, and the game apparatus 3 can control each of the infrared LEDs included in the marker section 6 to be lit up or out.

The controller 7 is an input device for providing the game apparatus 3 with operation data representing the particulars of the operation made thereon. The controller 7 and the game apparatus 3 are connected to each other via wireless communication. In the present embodiment, the controller 7 and the game apparatus 3 wirelessly communicate with each other by, for example, the Bluetooth® technology. Note that in another embodiment, the controller 7 and the game apparatus 3 may be connected to each other in a wired manner.

(Internal Structure of the Game Apparatus 3)

Figure 2:
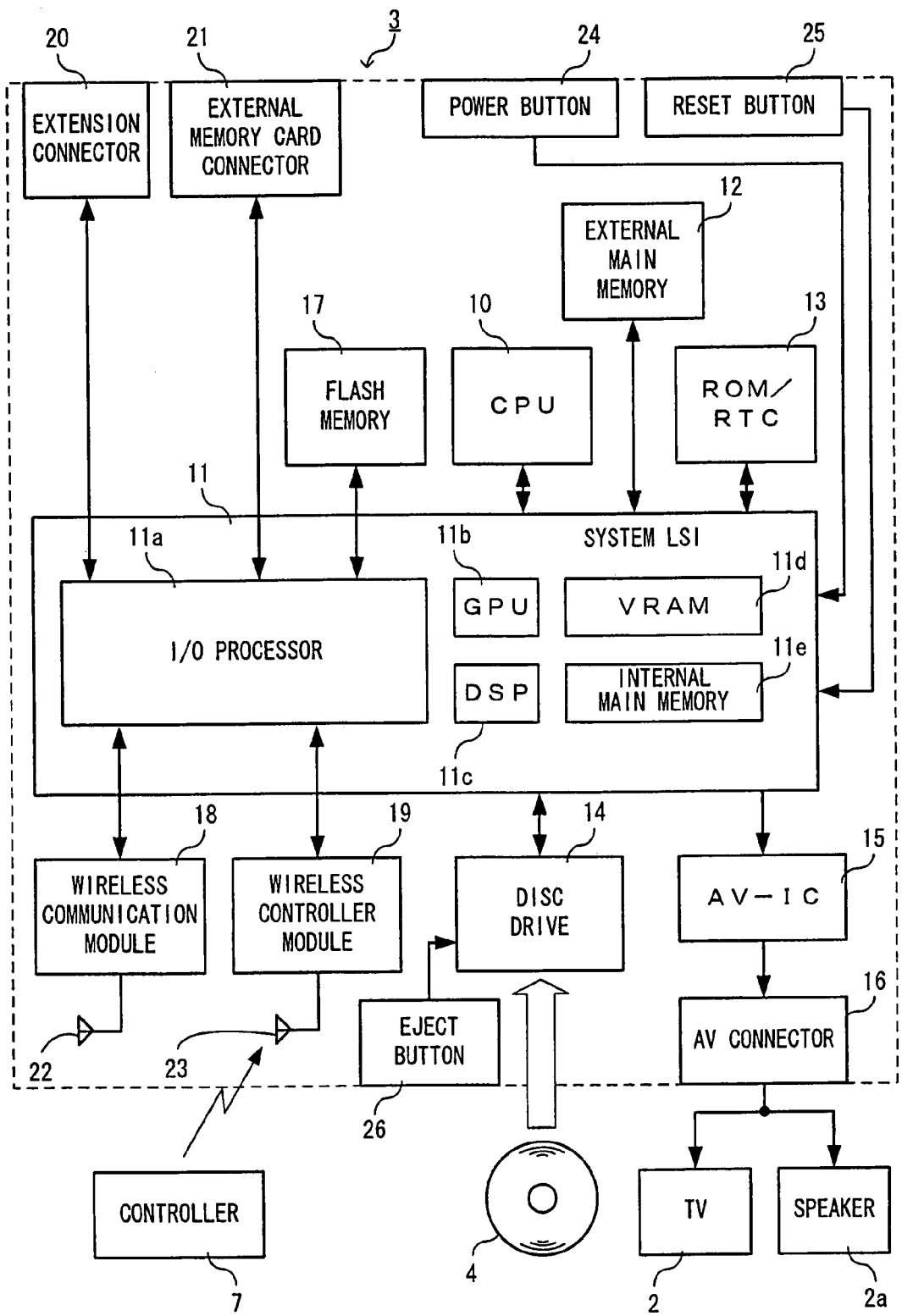
FIG. 2 is a block diagram showing a structure of a game apparatus 3.

Next, with reference to FIG. 2, an internal structure of the game apparatus 3 will be described. FIG. 2 is a block diagram showing a structure of the game apparatus 3. The game apparatus 3 includes a CPU 10, a system LSI 11, an external main memory 12, a ROM/RTC 13, a disc drive 14, an AV-IC 15, and the like.

The CPU 10 performs the game processing by executing the game program stored in the optical disc 4, and acts as a game processor. The CPU 10 is connected to the system LSI 11. The system LSI 11 is connected to the CPU 10 and also to the external main memory 12, the ROM/RTC 13, the disc drive 14, and the AV-IC 15. The system LSI 11, for example, controls data transfer between the elements connected thereto, generates images to be displayed, and obtains data from external devices. An internal structure of the system LSI 11 will be described below. The external main memory 12, which is of a volatile type, stores therein programs including the game program read from the optical disc 4, the game program read from a flash memory 17, or various other data. The external main memory 12 is used as a work area or a buffer area of the CPU 10. The ROM/RTC 13 includes a ROM (a so-called boot ROM) having a program for starting the game apparatus 3 incorporated therein and a clock circuit (RTC: Real Time Clock) for counting time. The disc drive 14 reads program data, texture data or the like from the optical disc 4 and writes the read data into an internal main memory 11e described below or the external main memory 12.

The system LSI 11 includes an input/output processor (I/O processor) 11a, a GPU (Graphics Processor Unit) 11b, a DSP (Digital Signal Processor) 11c, a VRAM 11d, and the internal main memory 11e. Although not shown, these elements 11a through 11e are connected to one another via an internal bus.

The GPU 11b is a part of drawing means and generates an image in accordance with a graphics command (a command to draw an image) from the CPU 10. The VRAM 11d stores data (polygon data, texture data, etc.) necessary for the GPU 11b to execute the graphics command. The GPU 11b uses the data stored in the VRAM 11d to generate image data.

The DSP 11c acts as an audio processor and generates audio data using sound data or sound wave (sound tone) data stored in the internal main memory 11e or the external main memory 12.

The image data and the audio data generated as described above are read by the AV-IC 15. The AV-IC 15 outputs the read image data to the TV 2 via an AV connector 16, and also outputs the read audio data to a speaker 2a built in the TV 2. Thus, the image is displayed on the TV 2 and also the sound is outputted from the speaker 2a.

The input/output processor 11a transmits or receives data to or from the elements connected thereto, or downloads data from external devices. The input/output processor 11a is connected to the flash memory 17, a wireless communication module 18, a wireless controller module 19, an expansion connector 20, and an external memory card connector 21. The wireless communication module 18 is connected to an antenna 22, and the wireless controller module 19 is connected to an antenna 23.

The input/output processor 11a is connected to a network via the wireless communication module 18 and the antenna 22, and thus can communicate with other game apparatuses or various servers also connected to the network. The input/output processor 11a periodically accesses the flash memory 17, and detects the presence or absence of data required to be transmitted to the network. When the data is present, the input/output processor 11a transmits the data to the network via the wireless communication module 18 and the antenna 22. The input/output processor 11a also receives, via the network, the antenna 22, and the wireless communication module 18, data transmitted from other game apparatuses or data downloaded from a download server, and stores the received data in the flash memory 17. The CPU 10 executes the game program and thus reads the data stored in the flash memory 17 to be used for the game program. The flash memory 17 may have stored therein data (data after or in the middle of the game) saved as a result of playing the game using the game apparatus 3 as well as the data to be transmitted to, or the data received from, the other game apparatuses or various servers.

Further, the input/output processor 11a receives, via the antenna 23 and the wireless controller module 19, operation data transmitted from the controller 7, and stores (temporarily stores) the operation data in a buffer area of the internal main memory 11e or the external main memory 12.

Furthermore, the input/output processor 11a is connected to the expansion connector 20 and the external memory card connector 21. The expansion connector 20 is a connector for an interface such as USB or SCSI. The expansion connector 20 may be connected to a medium such as an external storage medium, may be connected to a peripheral device such as another controller, or may be connected to a wired communication connector, so as to communicate with the network instead of the wireless communication module 18. The external memory card connector 21 is a connector for an external storage medium such as a memory card. For example, the input/output processor 11a can access an external storage medium via the expansion connector 20 or the external memory card connector 21 so as to store or read data.

The game apparatus 3 has a power button 24, a reset button 25, and an eject button 26. The power button 24 and the reset button 25 are connected to the system LSI 11. When the power button 24 is turned on, the elements of the game apparatus 3 are provided with power via an AC adaptor (not shown). When the reset button 25 is pressed, the system LSI 11 restarts a starting program of the game apparatus 3. The eject button 26 is connected to the disc drive 14. When the eject button 26 is pressed, the optical disc 4 is dismounted from the disc drive 14.

Figure 3:
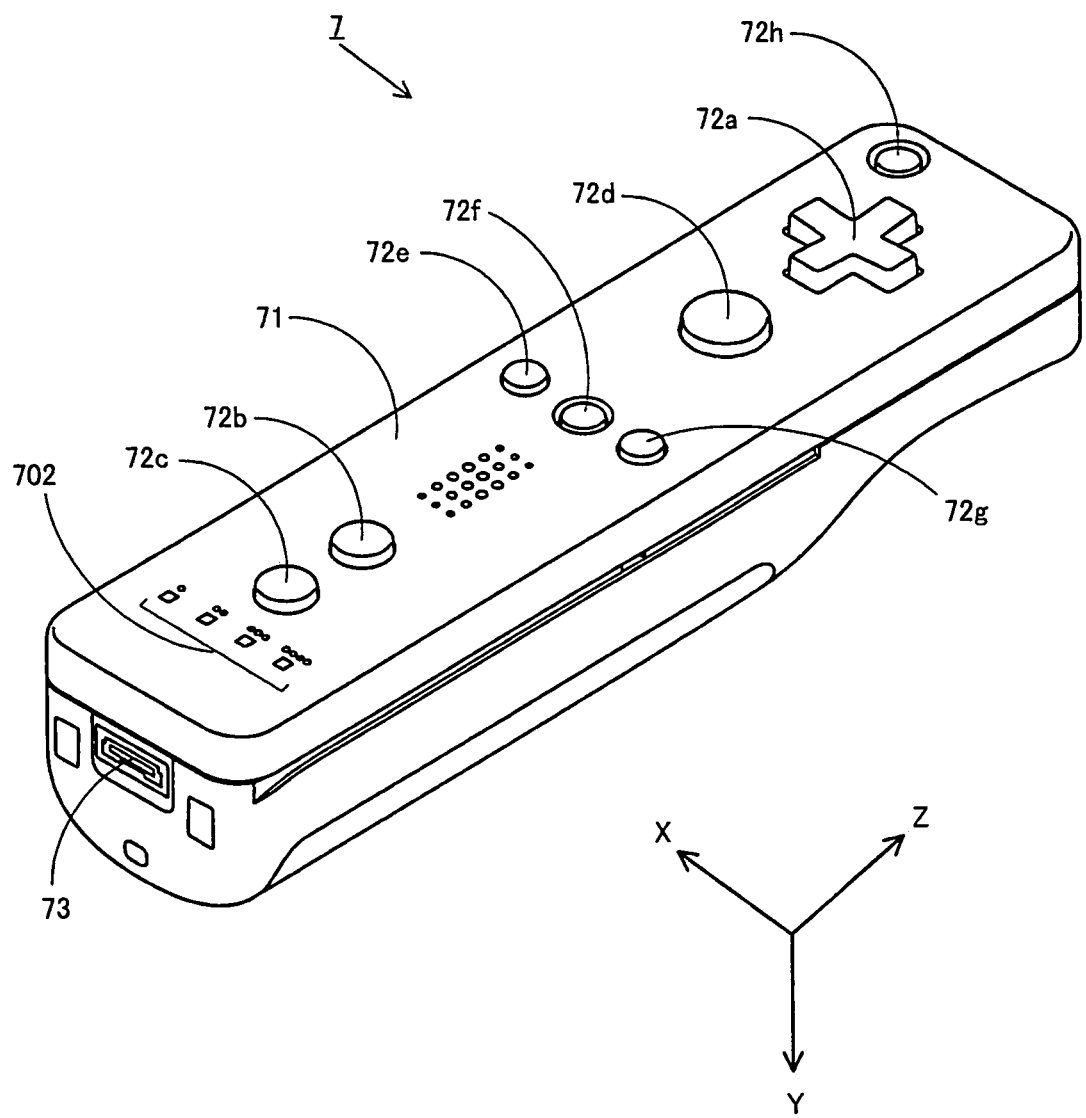
FIG. 3 is a perspective view showing a controller 7 as viewed from the top rear side thereof.
Figure 4:
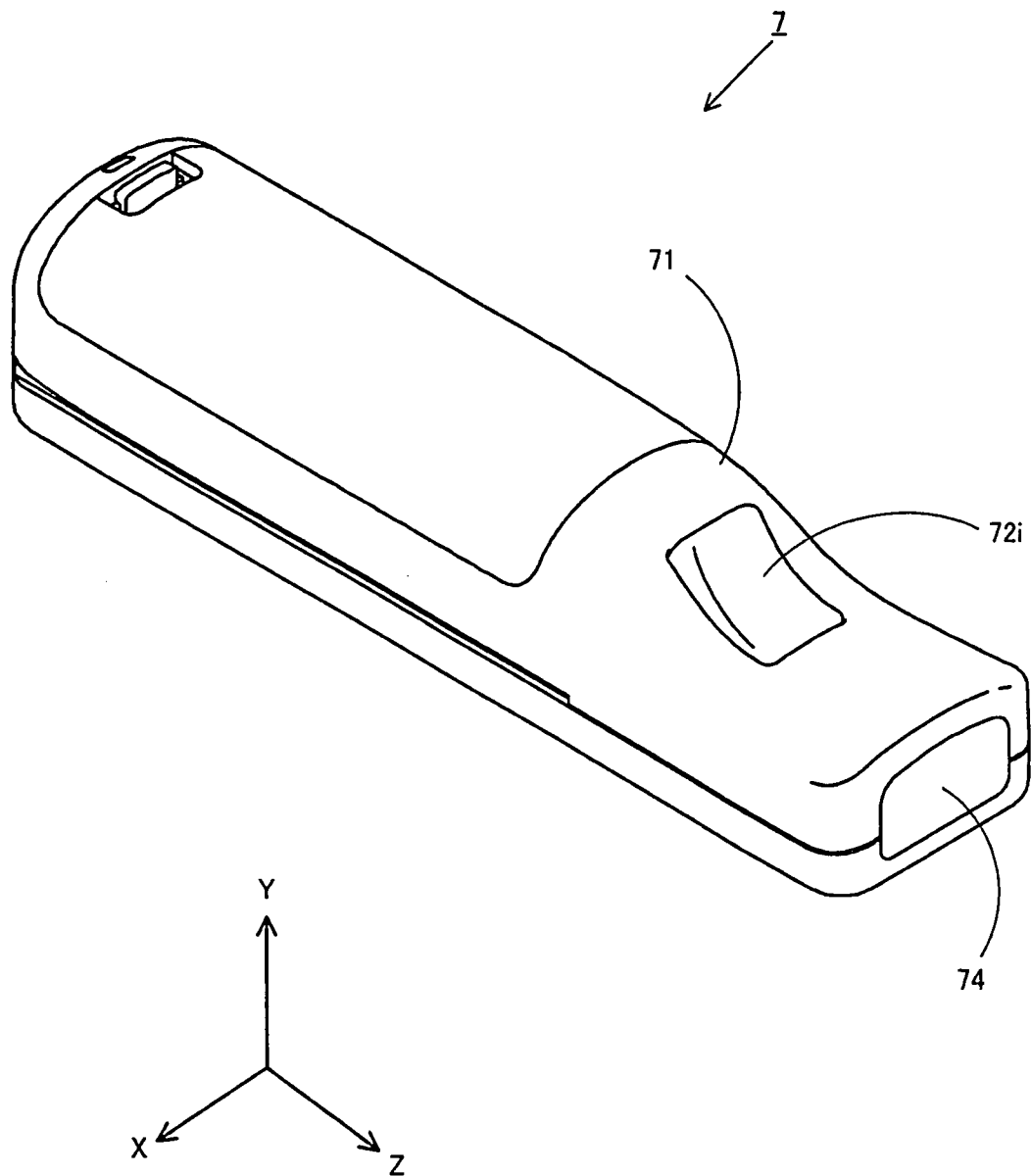
FIG. 4 is a perspective view showing the controller 7 as viewed from the bottom front side thereof.

With reference to FIGS. 3 and 4, the controller 7 will be described. Note that FIG. 3 is a perspective view showing the controller 7 as viewed from the top rear side thereof. FIG. 4 is a perspective view showing the controller 7 as viewed from the bottom front side thereof.

As shown in FIGS. 3 and 4, the controller 7 includes a housing 71 formed by plastic molding or the like. The housing 71 has a plurality of operation sections 72. The housing 71 has a generally parallelepiped shape extending in a longitudinal direction from front to rear. The overall size of the housing 71 is small enough to be held by one hand of an adult or even a child.

At the center of the front part of the top surface of the housing 71, a cross key 72a is provided. The cross key 72a is a cross-shaped four-direction push switch. The cross key 72a includes operation portions corresponding to the four directions (front, rear, right and left), which are respectively located on cross-shaped projecting portions arranged at 90 degree intervals. The player selects one of the front, rear, right, and left directions by pressing one of the operation portions of the cross key 72a. Through an operation on the cross key 72a, the player can, for example, instruct a direction in which a player character or the like appearing in a virtual game world is to move, or select one of a plurality of options.

Note that although the cross key 72a is an operation section for outputting an operation signal in accordance with the above-described direction input operation performed by the player, such an operation section may be provided in another form. For example, the cross key 72a may be replaced with an operation section which has four push switches extending in four directions, respectively, so as to form a cross and outputs an operation signal in accordance with the player pressing one of the push switches. Further, the cross key 72a may be replaced with an operation section which has the four push switches in combination with a center switch positioned at the center of the cross of the four push switches. Alternatively, the cross key 72a may be replaced with an operation section which includes an inclinable stick (a so-called joy stick) projecting from the top surface of the housing 71 and outputs an operation signal in accordance with the inclining direction of the stick. Still alternatively, the cross key 72a may be replaced with an operation section which includes a disc-shaped member horizontally slidable and outputs an operation signal in accordance with the sliding direction of the disc-shaped member. Still alternatively, the cross key 72a may be replaced with a touch pad.

Behind the cross key 72a on the top surface of the housing 71, a plurality of operation buttons 72b, 72c, 72d, 72e, 72f, and 72g are provided. The operation buttons 72b, 72c, 72d, 72e, 72f, and 72g are operation sections for outputting, when the player presses the heads thereof, operation signals assigned to the operation buttons 72b, 72c, 72d, 72e, 72f, or 72g, respectively. For example, the operation buttons 72b, 72c, and 72d are assigned with functions of a first button, a second button, and an A button, respectively. Further, for example, the operation buttons 72e, 72f, and 72g are assigned with functions of a minus button, a home button, and a plus button, respectively. The operation buttons 72a, 72b, 72c, 72d, 72e, 72f, and 72g are assigned with various operation functions in accordance with the game program executed by the game apparatus 3. Note that in an exemplary arrangement shown in FIG. 3, the operation buttons 72b, 72c, and 72d are arranged in a line at the center on the top surface of the housing 71 in the front-rear direction. Further, the operation buttons 72e, 72f, and 72g are arranged in a line in the left-right direction between the operation buttons 72b and 72d on the top surface of the housing 71. The operation button 72f has the top surface thereof buried in the top surface of the housing 71, so as not to be inadvertently pressed by the player.

Further, in front of the cross key 72a on the top surface of the housing 71, an operation button 72h is provided. The operation button 72h is a power switch for remote-controlling the power of the game apparatus 3 to be on/off. The operation button 72h also has the top surface thereof buried in the top surface of the housing 71, so as not to be inadvertently pressed by the player.

Further, behind the operation button 72c on the top surface of the housing 71, a plurality of LEDs 702 are provided. The controller 7 is assigned with a controller type (number) so as to be distinguishable from the other controllers 7. For example, the LEDs 702 are used for informing the player of the controller type currently set to controller 7 that he or she is using. Specifically, when transmission data is transmitted from the controller 7 to the wireless controller module 19, one LED among the plurality of LEDs 702 which corresponds to the controller type is lit up.

Further, on the top surface of the housing 71, a sound hole for outputting, to the outside, a sound from a speaker (a speaker 706 shown in FIG. 5) described below is provided between the operation button 72b and the operation buttons 72e, 72f and 72g.

On the other hand, on the bottom surface of the housing 71, a recessed portion is formed. The recessed portion is formed at a position at which an index finger or a middle finger of the player is to be located when the player holds the controller 7 by one hand so as to orient the front surface of the controller 7 toward the markers 6L and 6R. On a slope surface (on the rear surface side) of the recessed portion, an operation button 72i is provided. The operation button 72i is an operation section acting as, for example, a B button.

Further, on the front surface of the housing 71, an image pickup element 743 included in an imaging information calculation section 74 is provided. The imaging information calculation section 74 is a system for analyzing image data taken by the controller 7 and determining an area having a high brightness in the image data, so as to detect the position of the center of gravity, the size, and the like of the area. The imaging information calculation section 74 has, for example, a maximum sampling period of about 200 frames/sec., and thus can trace and analyze even a relatively fast motion of the controller 7. The imaging information calculation section 74 will be described in detail below. Further, on the rear surface of the housing 71, the connector 73 is provided. The connector 73 is, for example, an edge connector, and is used for engaging and connecting with a connecting cable, for example.

Here, to make the following description specific, a coordinate system to be set for the controller 7 is defined. As shown in FIGS. 3 and 4, an X-axis, a Y-axis, and a Z-axis, which are orthogonal to one another, are defined for the controller 7. Specifically, the longitudinal direction of the housing 71 corresponding to the front-rear direction of the controller 7 is defined as a Z-axis direction, and a direction toward the front surface (a surface on which the imaging information calculation section 74 is mounted) of the controller 7 is defined as a Z-axis positive direction. Further, the up-down direction of the controller 7 is defined as a Y-axis direction, and a direction toward the bottom surface (a surface on which the operation button 72i is provided) of the housing 71 is defined as a Y-axis positive direction. Furthermore, the left-right direction of the controller 7 is defined as an X-axis direction, and a direction toward the left side surface (a side surface not shown in FIG. 3 but shown in FIG. 4) of the housing 71 is defined as an X-axis positive direction.

Figure 5:
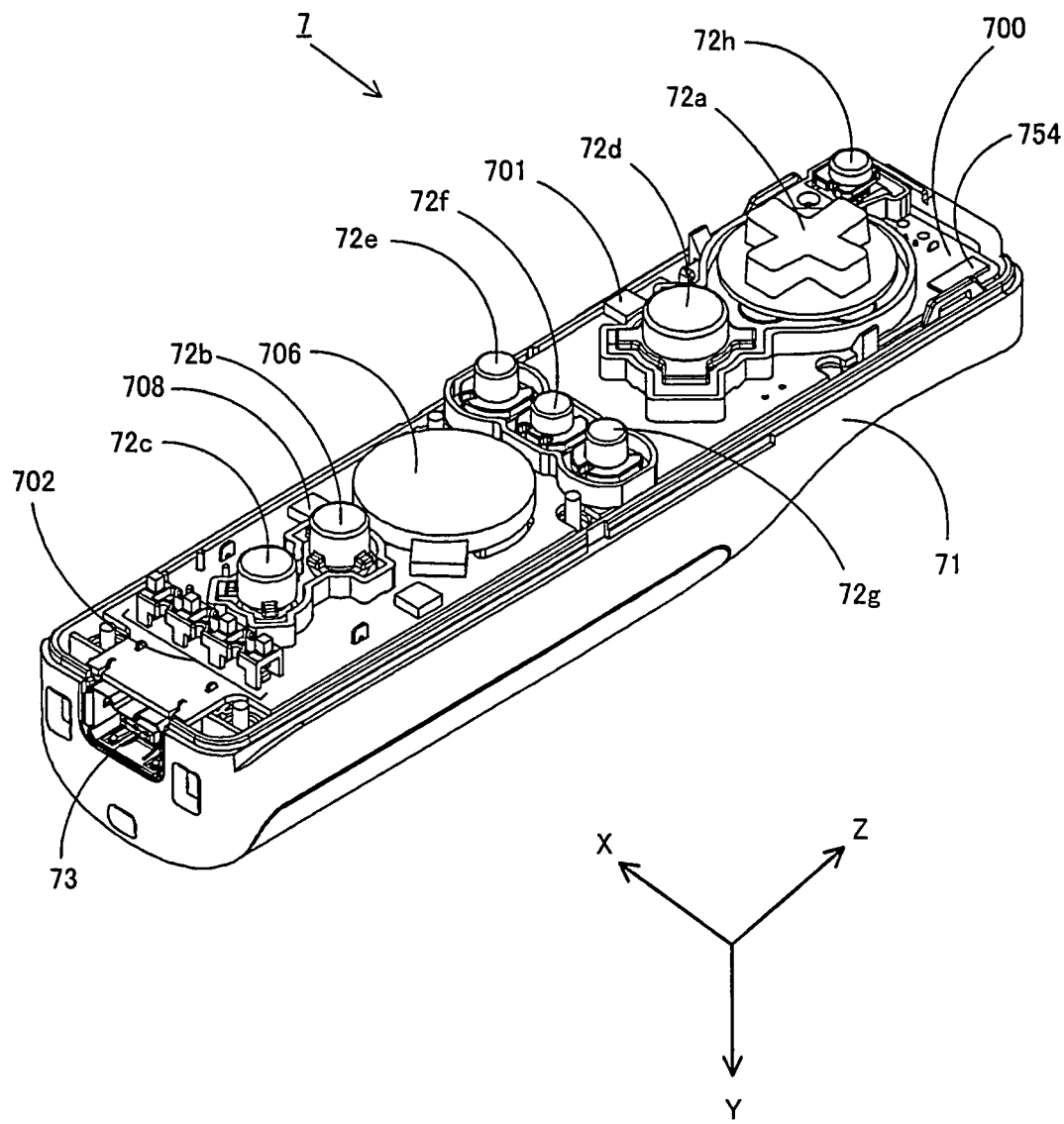
FIG. 5 is a perspective view showing a state where an upper casing of the controller 7 is removed.
Figure 6:
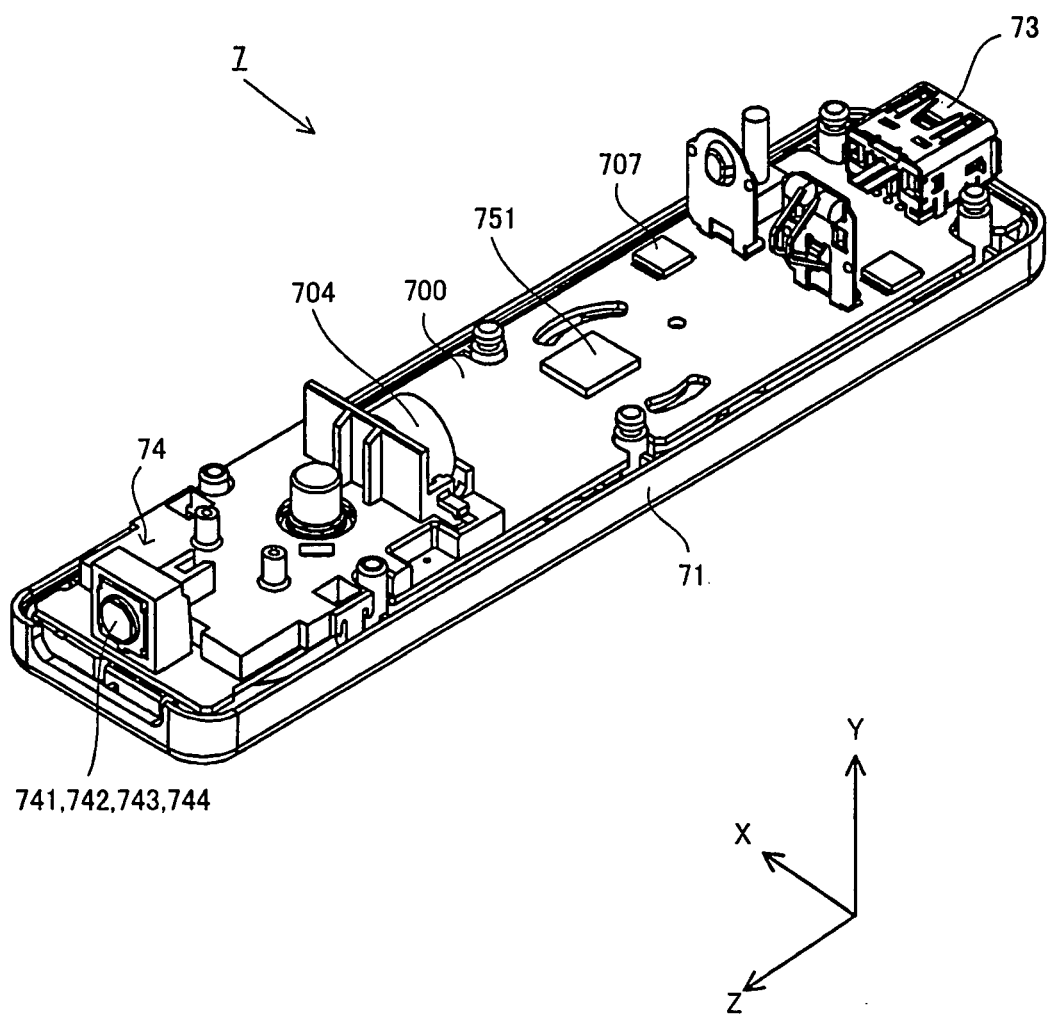
FIG. 6 is a perspective view showing a state where a lower casing of the controller 7 is removed.

Next, with reference to FIGS. 5 and 6, an internal structure of the controller 7 will be described. Note that FIG. 5 is a perspective view showing, as viewed from the top rear surface of the controller 7, a state where an upper casing (a part of the housing 71) of the controller 7 is removed. FIG. 6 is a perspective view showing, as viewed from the bottom front surface of the controller 7, a state where a lower casing (apart of the housing 71) of the controller 7 is removed. FIG. 6 is a perspective view showing the reverse side of a substrate 700 shown in FIG. 5.

As shown in FIG. 5, the substrate 700 is fixed inside the housing 71. On the top main surface of the substrate 700, the operation buttons 72a, 72b, 72c, 72d, 72e, 72f, 72g and 72h, an acceleration sensor 701, the LEDs 702, an antenna 754, and the like are provided. These elements are connected to a microcomputer 751 (see FIGS. 6 and 7) and the like via lines (not shown) formed on the substrate 700 and the like. Further, a wireless module 753 (see FIG. 7) and the antenna 754 allow the controller 7 to act as a wireless controller. Note that a quartz oscillator 703 (not shown), which is provided within the housing 71, generates a reference clock of the microcomputer 751 described below. On the top main surface of the substrate 700, the speaker 706 and an amplifier 708 are provided. Furthermore, the acceleration sensor 701 is provided on the substrate 700 to the left of the operation button 72d (i.e., provided not at the center portion of the substrate 700 but near the periphery of the substrate 700). Accordingly, the acceleration sensor 701 is, in accordance with the controller 7 rotating about the longitudinal direction thereof, capable of detecting acceleration containing a component exerted due to the centrifugal force, as well as detecting a directional change of gravity acceleration. Therefore, the game apparatus 3 and the like can perform a predetermined calculation so as to determine rotation of the controller 7 with sufficient accuracy based on the detected acceleration data.

On the other hand, as shown in FIG. 6, at the front edge of the bottom main surface of the substrate 700, the imaging information calculation section 74 is provided. The imaging information calculation section 74 includes an infrared filter 741, a lens 742, the image pickup element 743, and an image processing circuit 744 located on the bottom main surface of the substrate 700 in order, respectively, from the front surface of the controller 7. At the rear edge of the bottom main surface of the substrate 700, the connector 73 is attached. Further, on the bottom main surface of the substrate 700, a sound IC 707 and the microcomputer 751 are provided. The sound IC 707, connected to the microcomputer 751 and the amplifier 708 via the line formed on the substrate 700 and the like, outputs a sound signal to the speaker 706 via the amplifier 708 in accordance with the sound data transmitted from the game apparatus 3.

On the bottom main surface of the substrate 700, a vibrator 704 is attached. The vibrator 704 may be, for example, a vibration motor or a solenoid. The vibrator 704, connected to the microcomputer 751 via the line formed on the substrate 700 and the like, is powered on/off in accordance with vibration data transmitted from the game apparatus 3. The controller 7 is vibrated by an actuation of the vibrator 704, and the vibration is conveyed to the player's hand holding the controller 7. Thus, a so-called vibration-feedback game can be realized. The vibrator 704 is provided near the front part of the housing 71, and therefore a large vibration of the housing 71 allows the player holding the controller 7 to easily feel the vibration.

Next, with reference to FIG. 7, an internal structure of the controller 7 will be described. Note that FIG. 7 is a block diagram showing a structure of the controller 7.

Figure 7:
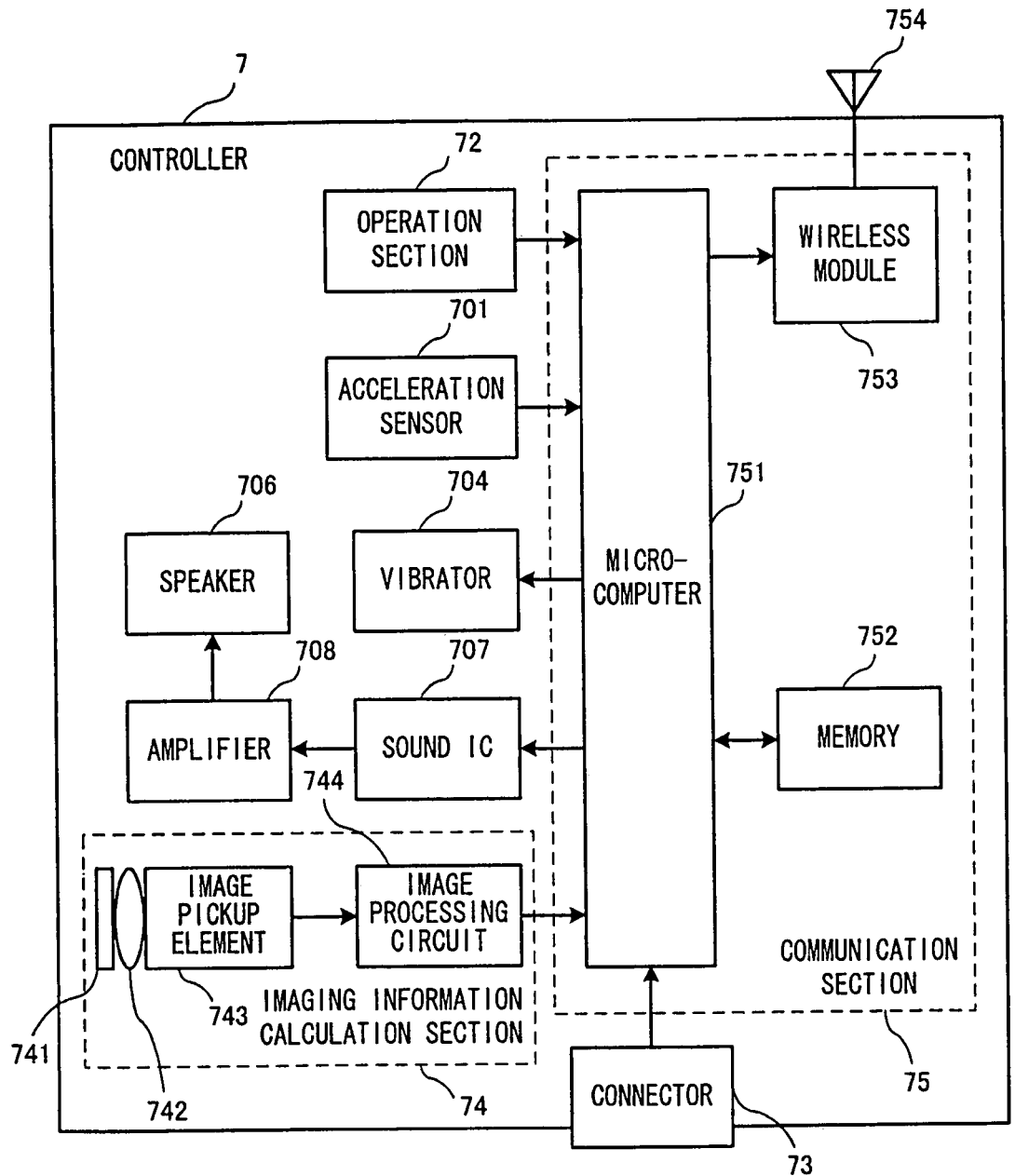
FIG. 7 is a block diagram showing a structure of the controller 7.

As shown in FIG. 7, the controller 7 includes a communication section 75, in addition to the operation sections 72, the imaging information calculation section 74, the acceleration sensor 701, the vibrator 704, the speaker 706, the sound IC 707, and the amplifier 708 as described above.

The imaging information calculation section 74 includes the infrared filter 741, the lens 742, the image pickup element 743, and the image processing circuit 744. The infrared filter 741 allows only infrared light to pass therethrough, among light incident on the front surface of the controller 7. The lens 742 collects the infrared light which has passed through the infrared filter 741, so as to output the infrared light to the image pickup element 743. The image pickup element 743 is a solid-state image pickup device such as a CMOS sensor or a CCD. The image pickup element 743 takes an image of the infrared light collected by the lens 742. Accordingly, the image pickup element 743 takes an image of only the infrared light which has passed through the infrared filter 741, so as to generate image data. The image data generated by the image pickup element 743 is processed by the image processing circuit 744. Specifically, the image processing circuit 744 processes the image data obtained by the image pickup element 743, senses an area thereof having a high brightness, and outputs the process result data, which represents the detected position coordinates and size of the area, to the communication section 75. Note that the imaging information calculation section 74 is fixed to the housing 71 of the controller 7, and therefore the imaging direction of the imaging information calculation section 74 can be changed by changing the direction of the housing 71.

The controller 7 preferably includes a three-axial (X-axis, Y-axis, and Z-axis) acceleration sensor 701. The three-axial acceleration sensor 701 senses linear acceleration in three directions, that is, the up-down direction (the Y-axis shown in FIG. 3), the left-right direction (the X-axis shown in FIG. 3), and the front-rear direction (the Z-axis shown in FIG. 3). Alternatively, in another embodiment, two-axial acceleration detection means for sensing linear acceleration along only the X-axis and the Y-axis (or a pair of other axes) may be used depending on a type of a control signal used for the game processing. Still alternatively, in yet another embodiment, one-axial acceleration detection means for sensing linear acceleration along only one of the X-axis, the Y-axis, and the Z-axis may be used depending on a type of a control signal used for the game processing. For example, the three-axial, the two-axial, and the one-axial acceleration sensors 701 as described above may be of the type available from Analog Devices, Inc. or STMicroelectronics N.V. Preferably, the acceleration sensor 701 is an electrostatic capacitance (capacitance-coupling) type that is based on silicon micro-machined MEMS (Micro Electro Mechanical Systems) technology. However, any other suitable technology of acceleration detection means (e.g., piezoelectric type or piezoresistance type) now existing or later developed may be used to provide the three-axial, the two-axial, and the one-axial acceleration sensors 701.

Acceleration detection means as used in the acceleration sensor 701 is only capable of sensing acceleration (linear acceleration) along a straight line corresponding to each axis of the acceleration sensor 701. In other words, direct output from the acceleration sensor 701 is limited to signals each indicating the linear acceleration (static or dynamic) along the one axis, the two axes, and the three axes thereof. As a result, the acceleration sensor 701 cannot directly sense physical characteristics such as a movement along a non-linear (e.g., arcuate) path, rotation, a rotational movement, an angular displacement, a tilt, a position, or a posture.

However, by performing an additional process for acceleration signals outputted from the acceleration sensor 701, additional information relating to the controller 7 can be estimated or calculated (determined), as those skilled in the art will readily understand from the description herein. For example, when static acceleration (gravity acceleration) is sensed, it is possible to determine the tilt of an object (the controller 7) indicated by a gravity vector, by performing, based on output from the acceleration 701, a calculation using a tilt angle and the sensed acceleration. Thus, when the acceleration sensor 701 is used in combination with the microcomputer 751 (or another processor such as the CPU 10 included in the game apparatus 3), it is possible to determine the tilt, the posture, or the position of the controller 7. Similarly, when the controller 7 including the acceleration sensor 701 is moved by being dynamically accelerated with the player's hand, it is possible to calculate various movements and/or positions of the controller 7 by processing the acceleration signals generated by the acceleration sensor 701. In another embodiment, the acceleration sensor 701 may include an embedded signal processor or another type of dedicated processor for performing any desired processing of the acceleration signals outputted from built-in acceleration detection means prior to outputting signals to the microcomputer 751. For example, when the acceleration sensor 701 is intended to detect static acceleration (e.g., gravity acceleration), the embedded or dedicated processor may convert a sensed acceleration signal into a corresponding tilt angle (or another preferable parameter). Data representing the acceleration respectively sensed by the acceleration sensor 701 is outputted to the communication section 75.

In another embodiment, as an acceleration sensor for detecting a movement of the controller 7, a gyro-sensor having built therein a rotation element, a vibration element, or the like may be employed. An exemplary MEMS gyro-sensor used in the present embodiment is available from Analog Devices, Inc. Unlike the acceleration sensor 701, the gyro-sensor can directly sense a rotation (or an angular velocity) about an axis of at least one gyro-element included therein. Thus, since the gyro-sensor and the acceleration sensor are basically different from each other, one of these devices is selected depending on the individual application, and accordingly, processes performed for output signals from these devices are required to be changed as appropriate.

Specifically, when a tilt or a posture is calculated using the gyro-sensor instead of the acceleration sensor, a significant change is required. That is, when the gyro-sensor is used, the value of the tilt is initialized at the start of detection. Thereafter, angular acceleration data outputted from the gyro-sensor is integrated. Next, the amount of change in tilt is calculated from the initialized tilt value. In this case, the calculated tilt has a value corresponding to an angle. On the other hand, when a tilt is calculated using the acceleration sensor, the tilt is calculated by comparing to a predetermined reference the value of a component of gravitational acceleration with respect to each axis. Therefore, the calculated tilt can be represented by a vector, and an absolute direction can be detected by acceleration detecting means without initialization. Further, the value of the calculated tilt is an angle when the gyro-sensor is used, while it is a vector when the acceleration sensor is used. Therefore, when the gyro-sensor is used instead of the acceleration sensor, the tilt data is required to be subjected to predetermined conversion, with a difference between the two devices taken into account. The characteristics of the gyro-sensor, as well as the basic difference between the acceleration detecting means and the gyro-sensor, are well known to those skilled in the art, and therefore will not be described in further detail herein. The gyro-sensor has an advantage of directly sensing a rotation, while the acceleration sensor generally has an advantage of being more cost-effective than the gyro-sensor when applied to a controller as used in the present embodiment.

The communication section 75 includes the microcomputer 751, a memory 752, the wireless module 753, and the antenna 754. The microcomputer 751 controls the wireless module 753 for wirelessly transmitting transmission data while using the memory 752 as a storage area during the process. Further, the microcomputer 751 controls operations of the sound IC 707 and the vibrator 704, based on data received by the wireless module 753 from the game apparatus 3 via the antenna 754. The sound-IC 707 processes sound data and the like transmitted from the game apparatus 3 via the communication section 75. Furthermore, the microcomputer 751 actuates the vibrator 704 based on, for example, vibration data (e.g., a signal for powering the vibrator 704 on/off) transmitted from the game apparatus 3 via the communication section 75.

Data from the controller 7 including an operation signal (key data) from the operation section 72, three-axial direction acceleration signals (X-axis, Y-axis and Z-axis direction acceleration data) from the acceleration sensor 701, and the process result data from the imaging information calculation section 74 is outputted to the microcomputer 751. The microcomputer 751 temporarily stores, in the memory 752, the respective data (the key data, the X-axis, Y-axis and Z-axis direction acceleration data, and the process result data) as transmission data to be transmitted to the wireless controller module 19. The wireless transmission from the communication section 75 to the wireless controller module 19 is performed periodically at predetermined time intervals. Since game processing is generally performed in a cycle of 1/60 sec., the wireless transmission is required to be performed in a shorter cycle time. Specifically, the game processing unit is 16.7 ms (1/60 sec.), and the transmission interval of the communication section 75 structured using the Bluetooth® technology is 5 ms. At the transmission timing to the wireless controller module 19, the microcomputer 751 outputs, as a series of operation information to the wireless module 753, the transmission data stored in the memory 752. The wireless module 753 uses, for example, the Bluetooth® technology so as to transmit the operation information as an electric wave signal thereof from the antenna 754 by using a carrier wave of a predetermined frequency. That is, the data from the controller 7 including the key data from the operation section 72, the X-axis, Y-axis and Z-axis direction acceleration data from the acceleration sensor 701, and the process result data from the imaging information calculation section 74 is transmitted from the controller 7. The wireless controller module 19 of the game apparatus 3 receives the electric wave signal, and the game apparatus 3 demodulates or decodes the electric wave signal so as to obtain the series of the operation information (the key data, X-axis, Y-axis and Z-axis direction acceleration data, and the process result data). Based on the obtained operation information and the game program, the CPU 10 of the game apparatus 3 performs the game processing. Note that in a case where the communication section 75 is structured using the Bluetooth® technology, the communication section 75 can also have a function of receiving transmission data wirelessly transmitted from other devices.

Next, an overview of an image generation process performed by the game apparatus 3 will be described.

Figures 8, 9:
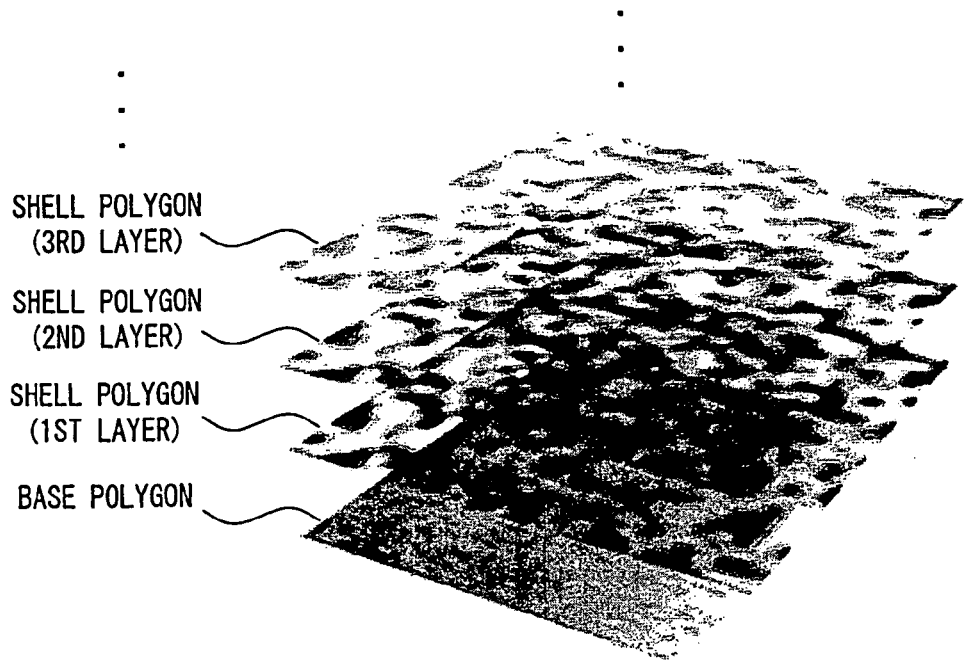
FIG. 8 is a diagram showing positional relationships among a base polygon and shell polygons.
FIG. 9 is an example of a shell texture image.

FIG. 8 is a diagram illustrating a method for representing hair, grass, and the like by multilayer semi-transparent polygons (hereinafter referred to as "shell polygons"). A base polygon is a three-dimensional polygonal model. The multilayer (the case of eight layers will be described in the present embodiment) shell polygons are positioned outside the base polygon as shown in FIG. 8, so as to represent hair, grass, and the like growing on the three-dimensional polygonal model.

That is, the base polygon is a polygon to be a base for positioning the multilayer shell polygons. The base polygon is texture-mapped with a texture (hereinafter referred to as a "base texture") representing a design of the three-dimensional polygonal model. Each of the first-layer through eighth-layer shell polygons is texture-mapped with a texture (hereinafter referred to as a "shell texture") representing sections of hairs, sections of grass blades, and the like.

FIG. 9 shows a specific example of a shell texture image. The shell texture image includes a color value (RGB values) indicating a color and an alpha value indicating transparency. For example, in a case where the tail (in a light brown color) of a fox is to be represented, the alpha value is set to create, for example, a patchy pattern shown at the left of FIG. 9. As shown in the patchy pattern, the black portion indicates a transparent portion and the white portion indicates a nontransparent portion (corresponding to sections of hairs). In each of the shell polygons, an area corresponding to the nontransparent portion is drawn using a predetermined color, and thus it is possible to obtain an image in which hairs in the predetermined color appear to grow from the base polygon. Note that an image having the same color values as those of the base texture may be used as a texture image to be used for texture-mapping the shell polygons, and thus it is possible to obtain an image in which hairs in colors corresponding to the design of the base polygon appear to grow from the base polygon. Alternatively, a single-color image prepared in advance may be used for being blended with the base texture so as to generate a texture image to be used for texture-mapping the shell polygons, and thus it is also possible to obtain an image in which hairs in colors corresponding to the design of the base polygon appear to grow from the base polygon. Further, when an image of another patchy pattern shown at the right of FIG. 9 is used for being blended with the base texture so as to generate a texture image to be used for texture-mapping the shell polygons, the above-described nontransparent portion (corresponding to sections of hairs) includes texels having shades different from one another, and thus it is possible to represent the quality of hair in a more realistic manner. Although the quality of hair (or grass) can be variously set depending on the pattern of the alpha value, a mere uniform pattern cannot create hair, and therefore the pattern of the alpha value is required at least to include a plurality of areas having values different from one another.

Figure 10:
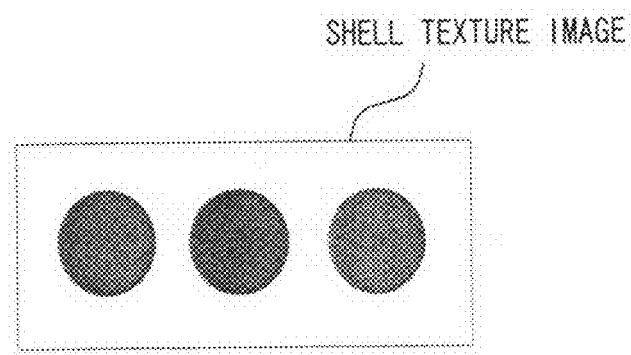
FIG. 10 is an example of the shell texture image.
Figure 11:
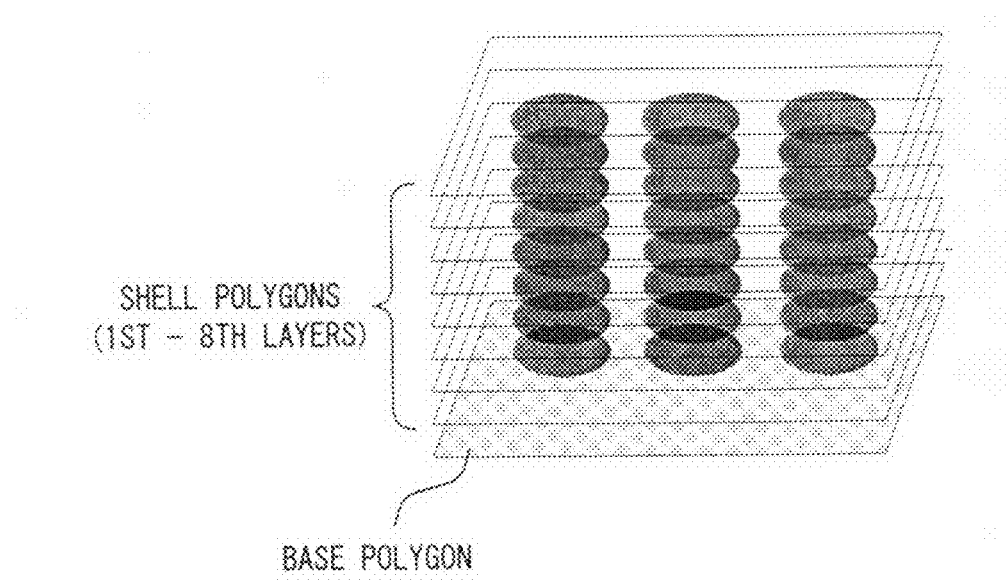
FIG. 11 is an example showing a case where the shell texture image of FIG. 10 is applied to all of the shell polygons in a uniform manner.

In the present embodiment, a common shell texture image is used for texture-mapping the first-layer through eighth-layer shell polygons. Note, however, that nothing but so-called straight hair or straight grass can be represented by merely texture-mapping all of the first-layer through eighth-layer shell polygons with the same shell texture image in the same manner. For example, in a case where the first-layer through eighth-layer shell polygons are simply texture-mapped with the shell texture image shown in FIG. 10, hairs growing perpendicularly from the base polygon are displayed as shown in FIG. 11, and therefore the detailed appearance of hair and the detailed appearance of a hair bundle cannot be represented. As another example, in a case where the first-layer through eighth-layer shell polygons are simply texture-mapped with the shell texture image shown in FIG. 9, nothing but the tail of a fox growing straight hair shown in FIG. 12 can be represented.

Figures 12, 13:
FIG. 12 is an example showing a case where the shell texture image of FIG. 9 is applied to all of the shell polygons in a uniform manner.
FIG. 13 is an example of a distortion map.

In order to easily realize a greater variety of representations such as the detailed appearance of hair and the detailed appearance of a hair bundle, the present embodiment employs a method for distorting a texture image using a distortion map shown in FIG. 13 so as to texture-map each layer of the shell polygons with the texture image. The distortion map as used herein is a map having a definition of what portion of the shell texture image is to be distorted in what direction and to what degree. In the present embodiment, the distortion map includes a horizontal distortion map in which a distortion amount in a horizontal direction (an s-axis direction shown in FIG. 14A) is defined for the shell texture image, and also includes a vertical distortion map in which a distortion amount in a vertical direction (a t-axis direction shown in FIG. 14A) is defined for the shell texture image. In the present embodiment, the value of each point (a texel) of the horizontal distortion map and the vertical distortion map ranges from 0 to 255 so as to indicate the distortion amount defined thereat. Note that a texture image, in general, includes three color values (R, G, and B) and an alpha value. Accordingly, the value of texel of the horizontal distortion map is assigned to one of the three color values and the alpha value included in the texture image and also the value of texel of the vertical distortion map is assigned to another one of the three color values and the alpha value included in the texture image, and thus the horizontal distortion map and the vertical distortion map can be treated (i.e., created and changed by image editing software, checked on the display screen, and the like) as if a texture image.

Functions of the distortion map will be described in detail below.

Figure 14A:
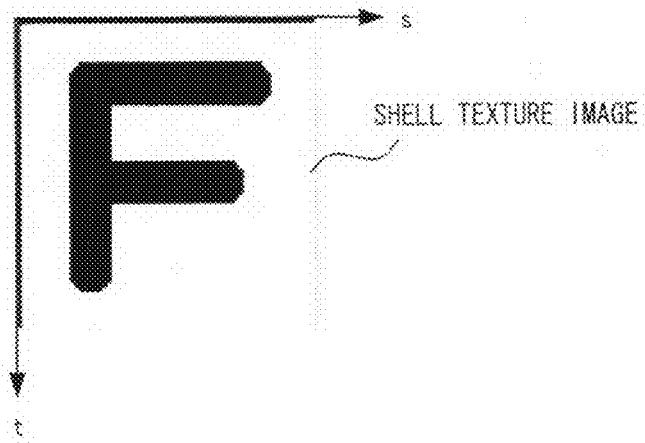
FIG. 14A is an example of the shell texture image.
Figure 14B:
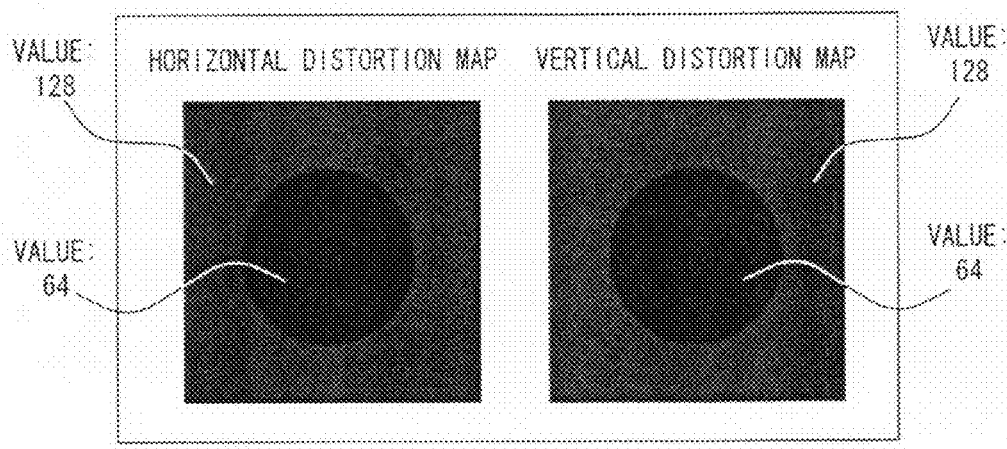
FIG. 14B is an example of the distortion map.
Figure 14C:
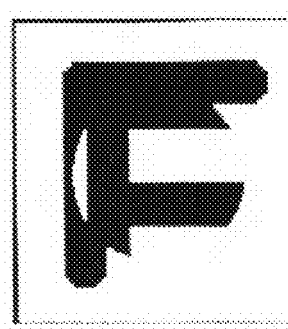
FIG. 14C is a texture image obtained by distorting the shell texture image of FIG. 14A by the distortion map of FIG. 14B.

As an example, described is a case where the shell texture image shown in FIG. 14A is distorted based on the distortion map (the horizontal distortion map and the vertical distortion map) shown in FIG. 14B. As shown in the example of FIG. 1B, the horizontal distortion map and the vertical distortion map each have a circle drawn at its center. The value of texel is 64 within the circle, while the value of texel is 128 outside the circle. Note that since the distortion map can be treated as if an image as described above and can correspond to the texture image by being overlapped therewith, each value of the distortion map is also referred to as the "texel". The absolute value of the resulting value obtained by subtracting 128 from the value of texel indicates the distortion amount, and the sign (+ or −) of the resulting value indicates the distortion direction. The distortion of the texture image results from reading the texel of a position shifted from the texel of the original image corresponding to the texel of the distortion map, and therefore the resultant image appears to have moved in a direction reverse to the direction in which the read position has been shifted. Hereinafter, the direction reverse to the shift direction of the read texel is referred to as the "distortion direction". For example, when an upper-left texel is read, the distortion direction of the image is bottom right. In the horizontal distortion map and the vertical distortion map, the distortion amount=0 (i.e., no distortion) at a portion where the value of texel is 128. Further, in the horizontal distortion map, the shift direction is the right direction (i.e., an s-axis positive direction shown in FIG. 14A) and thus the distortion direction is the left direction at a portion where the value of texel is larger than 128, while the shift direction is the left direction (i.e., an s-axis negative direction shown in FIG. 14A) and thus the distortion direction is the right direction at a portion where the value of texel is smaller than 128. Furthermore, in the vertical distortion map, the shift direction is the lower direction (i.e., a t-axis positive direction shown in FIG. 14A) and thus the distortion direction is the upper direction at a portion where the value of texel is larger than 128, while the shift direction is the upper direction (i.e., a t-axis negative direction shown in FIG. 14A) and thus the distortion direction is the lower direction at a portion where the value of texel is smaller than 128. As a result, when the shell texture image shown in FIG. 14A is distorted based on the distortion map shown in FIG. 14B, a distorted texture image shown in FIG. 14C is obtained and the shell polygons are texture-mapped with the distorted texture image. Note that although, for ease of description, the same image is used herein as the horizontal distortion map and the vertical distortion map, different images may be used as the respective maps.

Figure 15:
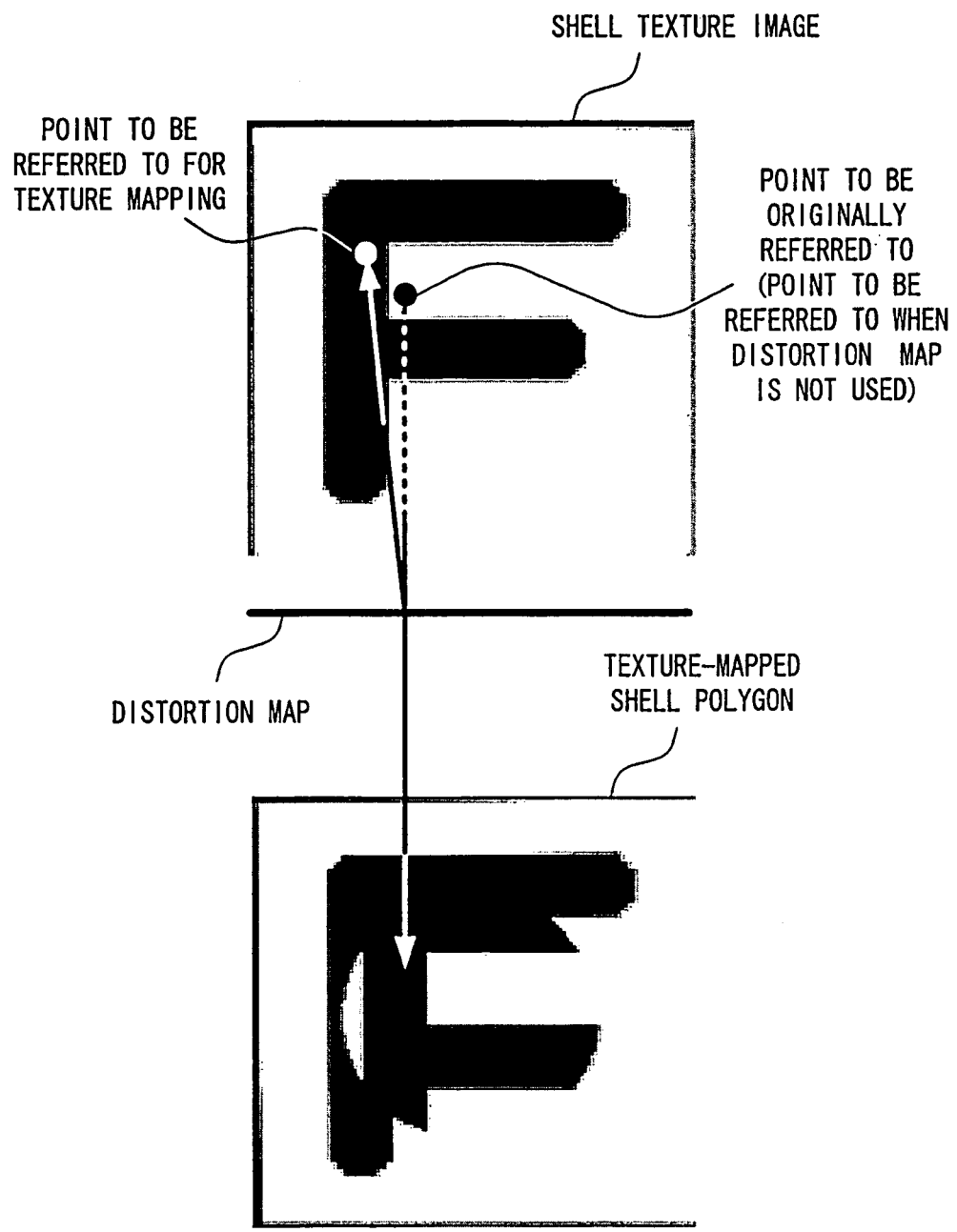
FIG. 15 is a diagram showing a detailed process of distorting the shell texture image by the distortion map.

FIG. 15 shows a detailed process of distorting the shell texture image by the distortion map. The texture image shown in FIG. 14C is realized by referring to, as a reference point (i.e., a point for reading the color value and the alpha value) of the shell texture image used for texture-mapping the shell polygons, a point shifted from the original reference point (i.e., a point to be referred to when the distortion map is not used) by the distance and in the direction both defined in the distortion map.

Figure 16A:
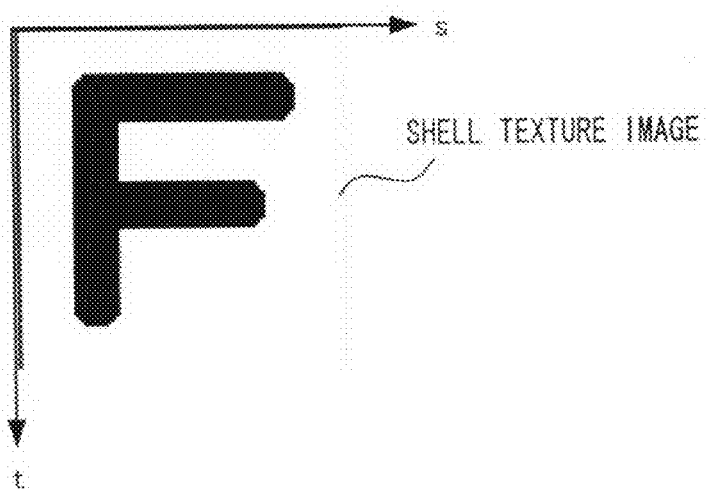
FIG. 16A is an example of the shell texture image.
Figure 16B:
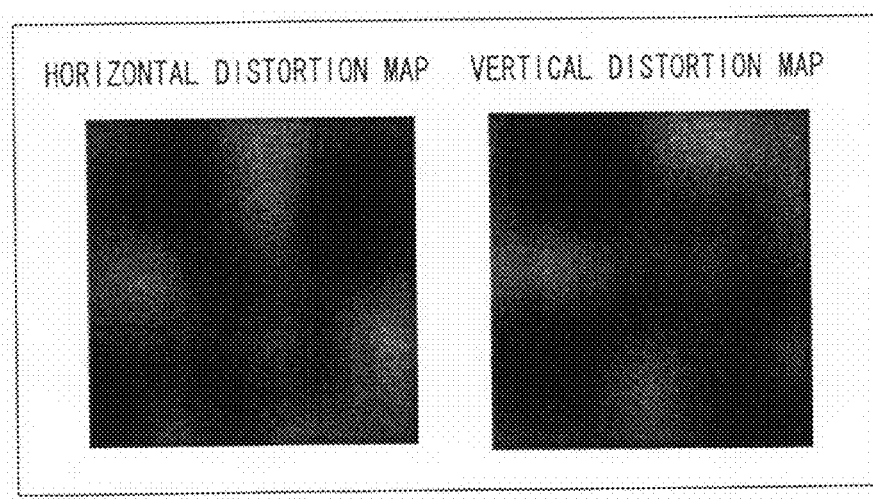
FIG. 16B is an example of the distortion map.
Figure 16C:
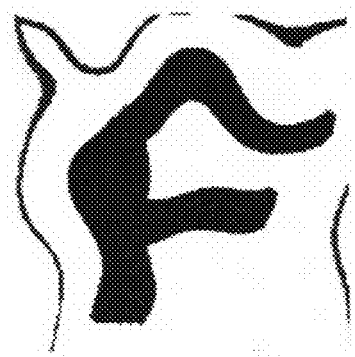
FIG. 16C is a texture image obtained by distorting the shell texture image of FIG. 16A by the distortion map of FIG. 16B.

Note that as shown in the example of FIGS. 14A through 14C, the values defined in the distortion map discontinuously vary (i.e., the value of texel changes drastically from the outside to the inside of the circle). In contrast, as shown in the example of FIGS. 16A through 16C, the values defined in the distortion map continuously (smoothly) vary, and thus a smoothly sinuous texture image shown in FIG. 16C can be obtained by distorting the shell texture image shown in FIG. 16A using the distortion map shown in FIG. 16B.

In the present embodiment, the shell polygons are texture-mapped with the shell texture image distorted using the distortion map as described above. However, nothing but the straight hair shown in FIGS. 11 and 12 can still be represented by merely distorting the shell texture image in a uniform manner for all of the first-layer through eighth-layer shell polygons. In the present embodiment, consequently, the shell polygons are texture-mapped with the shell texture image by adjusting the distortion amount of the shell texture image in such a manner that the farther the shell polygon is from the base polygon, the more distorted the shell texture image is.

Figure 17:
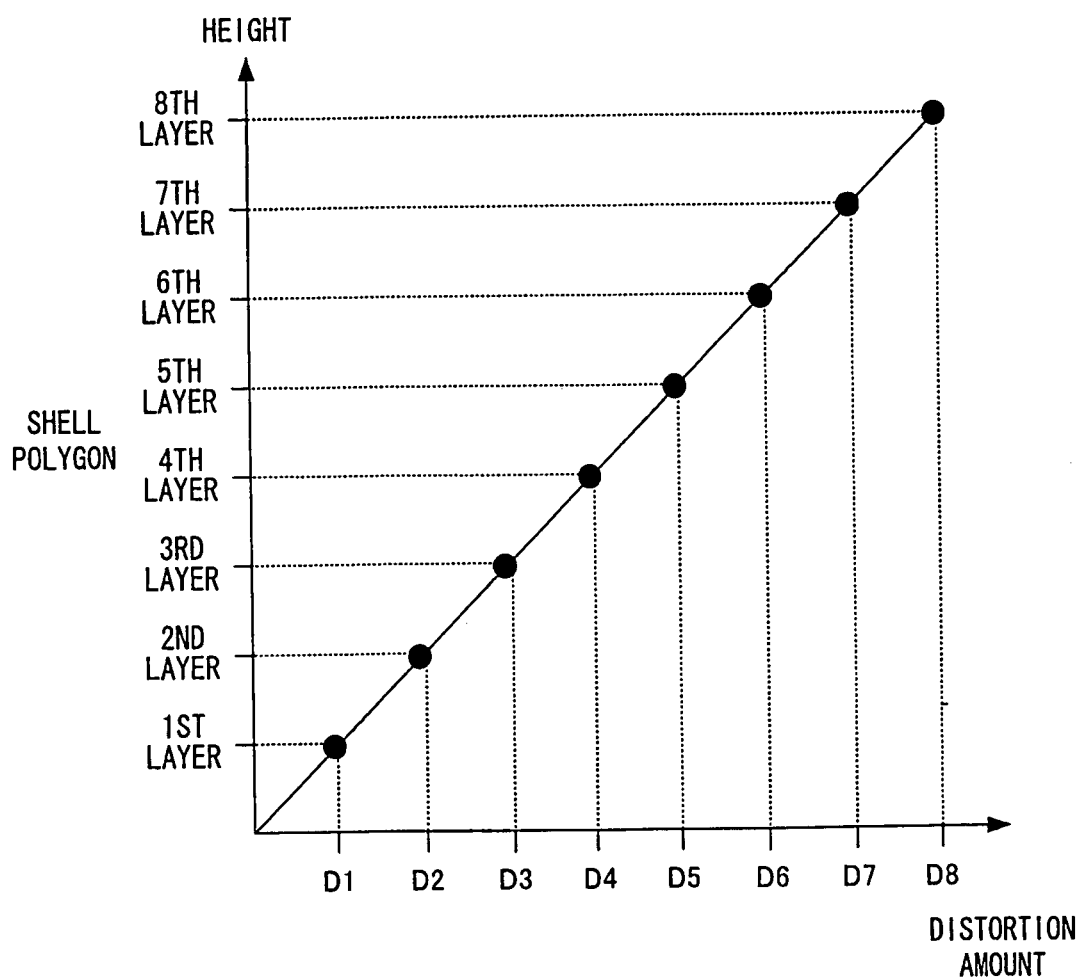
FIG. 17 is a diagram showing a relationship between the height and the distortion amount of each layer of the shell polygons.
Figure 18:
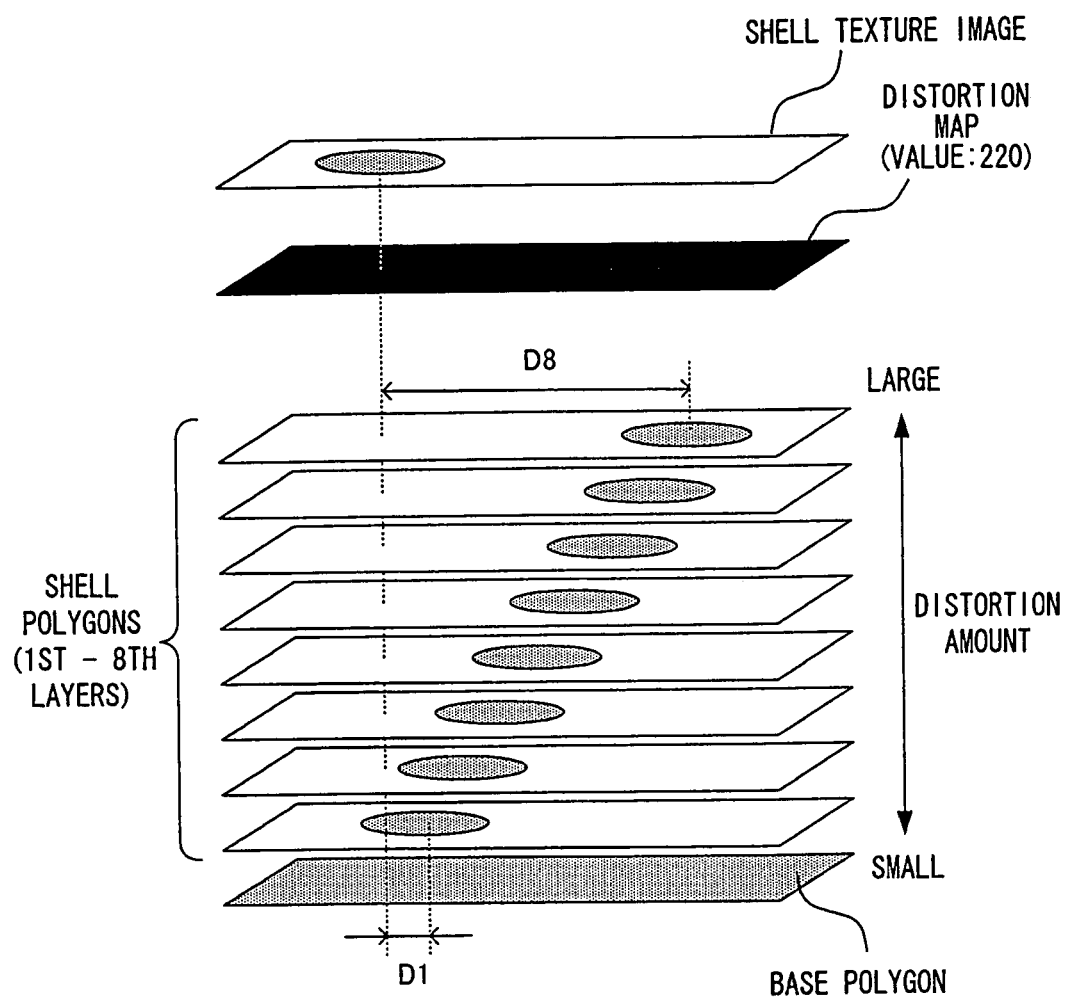
FIG. 18 is an example showing a case where texture mapping is performed using the distortion map.

For example, as shown in FIG. 17, the distortion amount of the shell texture image is adjusted to be proportional to the height (i.e., the distance from the base polygon) of each layer of the shell polygons. As a specific example, described is a case where the first-layer through eighth-layer shell polygons are texture-mapped with the shell texture image (which has only one section of a hair drawn thereon), as shown in FIG. 18, distorted using the distortion map at each point of which the value of texel is 220. In this case, the distortion amount defined in the distortion map is the absolute value of the resulting value obtained by subtracting 128 from 220, i.e., 92. Therefore, the eighth-layer shell polygon is texture-mapped with the shell texture image distorted by the distance (D8) corresponding to the distortion amount of 92. Further, in a case where the height of the fourth layer is half the height of the eighth layer, the distortion amount 92 of the eighth layer is multiplied by a half so as to set the resulting value 46 as the distortion amount of the fourth layer. Therefore, the fourth-layer shell polygon is texture-mapped with the shell texture image distorted by the distance (D4) corresponding to the distortion amount of 46. Similarly, the other layers are also texture-mapped by determining the distortion amount thereof in accordance with the heights thereof. As a result, it is possible to represent a hair growing at an angle from the base polygon as shown in FIG. 18.

Note that as shown in FIG. 17, the shell polygons are positioned at regular intervals. However, even when the shell polygons are not positioned at regular intervals, a hair similar to that shown in FIG. 18 can be represented by calculating the distortion amount of each layer so as to be proportional to the height thereof. Note that in a case where the shell polygons are positioned at regular intervals, the number of each layer is proportional to the height thereof, and therefore the distortion amount thereof may be determined using the layer number (the sequential number of each layer) thereof instead of the height. Alternatively, even when the shell polygons are not positioned at regular intervals, the distortion amount of each layer may be determined using the layer number thereof, if need be.

Figure 19:
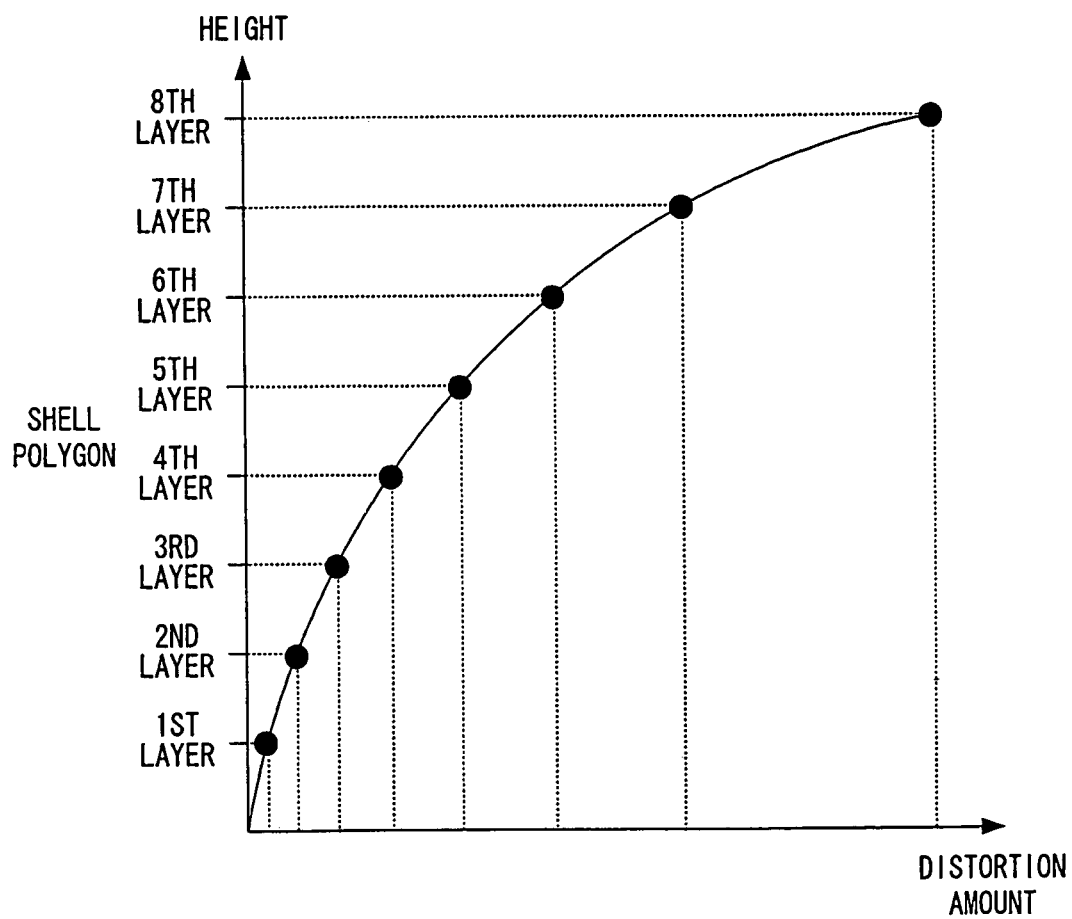
FIG. 19 is a diagram showing a relationship between the height and the distortion amount of each layer of the shell polygons.

Note that although, as shown in the example of FIG. 17, the distortion amount of each layer of the shell polygons is proportional to the height thereof, the present invention is not necessarily limited thereto. For example, the distortion amount of each layer may be determined in accordance with an arbitrary curve shown in FIG. 19. Thus, not only a straight hair or a straight grass blade shown in FIG. 18 but also a curved hair and a curved grass blade can be represented. It is more preferable that a user can freely change the above-described curve.

Figure 20:
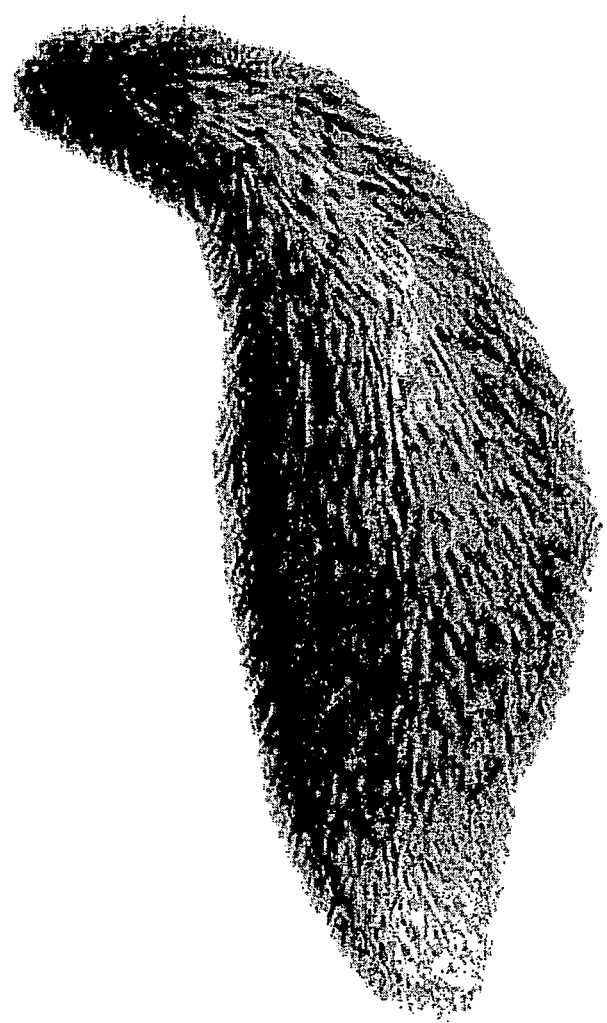
FIG. 20 is an example of an image created using the distortion map.

Note that while it is possible to represent the direction (the detailed appearance) of a hair (or a grass blade, etc.) using the distortion map having a uniform value of texel shown in FIG. 18, it is possible to change the direction of a hair depending on a portion by using the distortion map having nonuniform values of texel shown in FIG. 13, and thus it is possible to realize a greater variety of representations such as the detailed appearance of a hair bundle (the detailed appearance of hairs locally gathering). Note that although the vertical distortion map shown in FIG. 13 may appear to have a uniform value of texel, the vertical distortion map, in fact, has a patchy pattern, as does the horizontal distortion map. FIG. 20 shows an image of the tail of a fox, which is actually created using the distortion map shown in FIG. 13.

Note that the transparency used for texture-mapping the shell polygons with the shell texture image distorted by the distortion map, is basically determined based on the alpha value of the shell texture image. However, in order to realize a more natural representation, the transparency may be determined such that the greater the height (the distance from the base polygon) of the shell polygon is, the greater the transparency of the shell texture image to be used for texture-mapping the shell polygon is (see FIG. 8).

Figure 21:
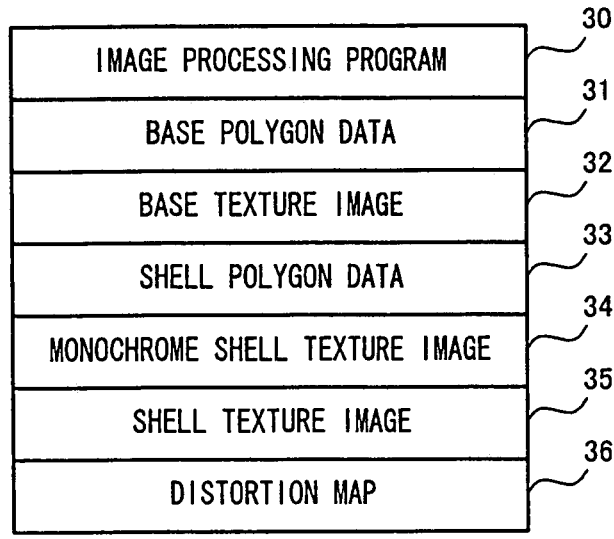
FIG. 21 is a memory map of an external main memory 12.

FIG. 21 is a memory map of the external main memory 12. Note that the internal main memory 11e may be used instead of the external main memory 12. The external main memory 12 stores an image processing program 30, base polygon data 31, a base texture image 32, shell polygon data 33, a monochrome shell texture image 34, a shell texture image 35, and a distortion map 36.

Figure 22:
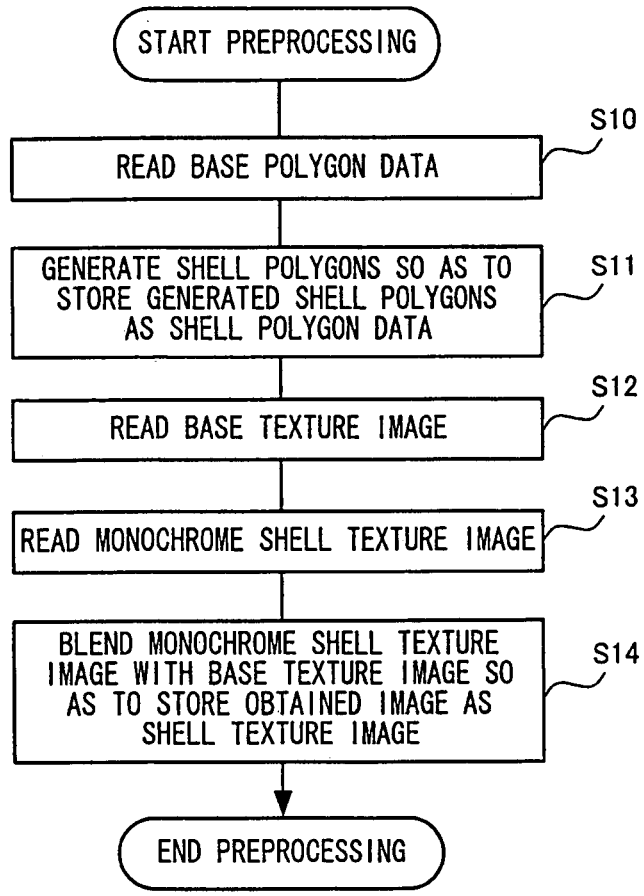
FIG. 22 is a flow chart showing the flow of a preprocessing.
Figure 23:
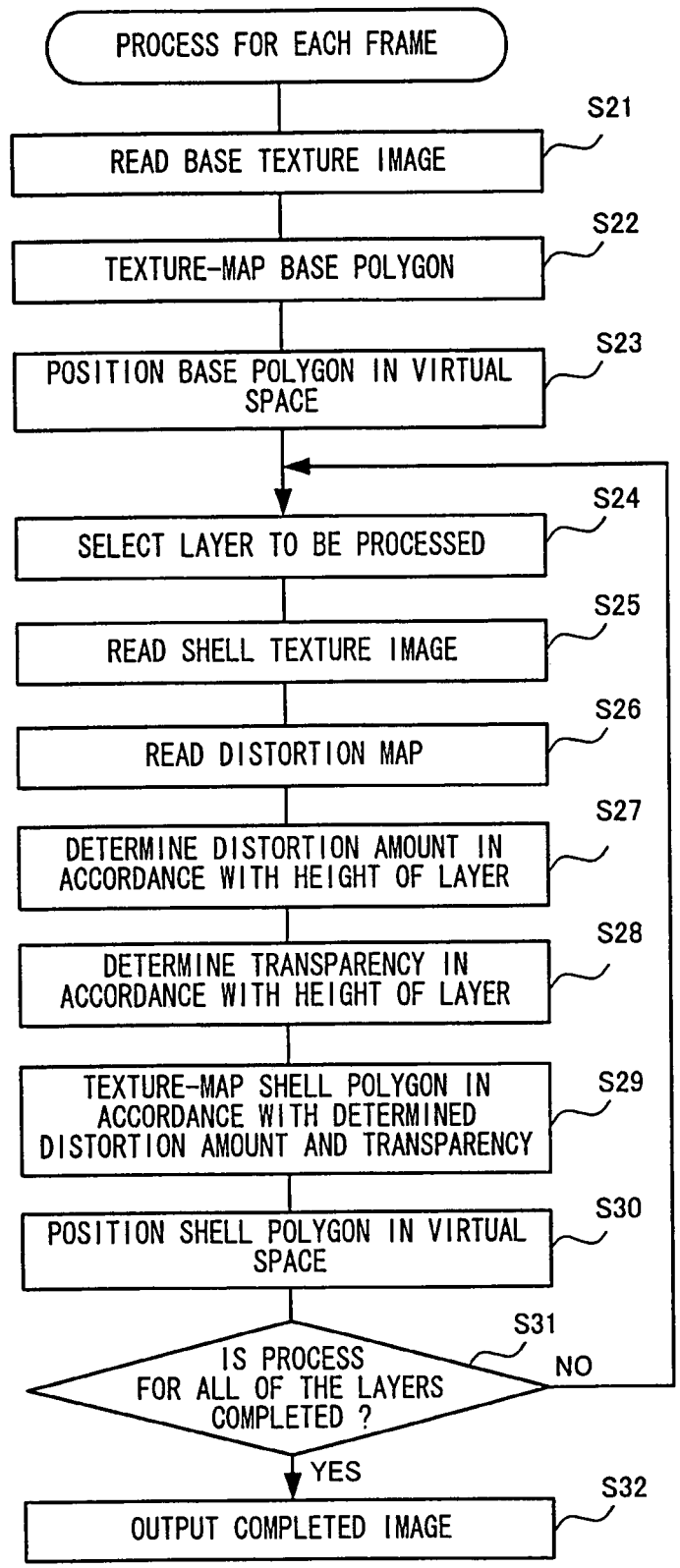
FIG. 23 is a flow chart showing the flow of a process performed for each frame.

The image processing program 30 is a computer program for causing a computer (the CPU 10 or the GPU 11b) to execute processes shown in flowcharts of FIGS. 22 and 23, and in the present embodiment, is loaded from the optical disc 4 to the external main memory 12. Note, however, that the image processing program 30 may be provided not only by the optical disc 4 but also by another arbitrary external storage medium, may be provided by another computer system via a wired or wireless communication circuit, or may be recorded in advance in a non-volatile storage device (not shown) provided within the game apparatus 3.

The base polygon data 31 is data for constructing the base polygon shown in FIG. 8 and includes information such as vertex coordinates and normal vectors of the polygon. The base polygon data 31 is typically loaded from the optical disc 4 to the external main memory 12.

The base texture image 32 is image data representing a design of the base polygon, and is typically loaded from the optical disc 4 to the external main memory 12.

The shell polygon data 33 is data for constructing a plurality of shell polygons shown in FIG. 8, and in the present embodiment, is generated based on the base polygon data 31. Specifically, for example, based on the base polygon data 31, new vertices are generated by shifting vertices of the base polygon by predetermined distances in normal vector directions, and thus the shell polygons can be generated based on the generated vertices. Note that instead of being generated based on the base polygon data 31, the shell polygon data 33 may be generated in advance and stored in the optical disc 4, so as to be loaded from the optical disc 4 to the external main memory 12. As a data structure, for example, the shell polygon data 33 may include only coordinate data of the vertices and share, with the base polygon data 31, topology information representing connection relationships among the vertices included in each of the polygons, connection relationships among the polygons, and the like, or the shell polygon data 33 may store therein both the coordinate data and the topology information, with respect to each layer.

The monochrome shell texture image 34 is monochrome image data representing sections of hairs. In order to easily generate an image in which from each point of the base polygon, a hair (or a grass blade) having substantially the same color as that of each point appears to grow, the present embodiment employs a method for generating the shell texture image 35 by blending the base texture image 32 with the monochrome shell texture image 34 indicating only brightness. Note, however, that the above-described blending process is not essential in the present invention, and the shell texture image 35 prepared in advance as an image including color information may be loaded from the optical disc 4 to the external main memory 12.

The shell texture image 35 is image data representing designs of the plurality of shell polygons shown in FIG. 8, and in the present embodiment, is generated based on the base texture image 32 and the monochrome shell texture image 34 so as to be stored in the external main memory 12, as described above.

The distortion map 36 is information indicating manners of distorting (the distortion direction and the distortion amount) the shell texture image 35 as shown in FIG. 13. Note that although, in the present embodiment, the shell texture image 35 is distorted using the distortion map 36, the present invention is not limited thereto, and the shell texture image 35 may be distorted using another arbitrary method. For example, the shell texture image 35 may be distorted using a predetermined function so as to map each point of the shell texture image 35. Further, the distortion map 36 may not necessarily be static data, and may be changed with respect to a unit of time in accordance with the passage of time, user input, a game situation, or other arbitrary conditions. By incorporating the above-described process, the direction and the quality of hair, grass, and the like can be changed in accordance with the passage of time and the like, and thus it is possible to generate, for example, a moving image of hair or grass swaying in the wind, a moving image of hair suddenly standing on end, and the like.

Next, with reference to the flow charts of FIGS. 22 and 23, the flows of operations based on the image processing program 30 and performed by the CPU 10 or the GPU 11b will be described. Note that a process of each step shown in the flow charts of FIGS. 22 and 23 may be performed by either the CPU 10 or the GPU 11b, and therefore each step may be performed by the more appropriate of the CPU 10 and the GPU 11b. In the following description, described is a case where each step shown in the flow chart of FIG. 22 is performed by the CPU 10 and each step shown in the flow chart of FIG. 23 is performed by the GPU 11b.

FIG. 22 is the flow chart showing the flow of a preprocessing performed as a preparation process prior to actually displaying an image.

When the preprocessing is started, the CPU 10 reads the base polygon data 31 from the external main memory 12, in step S10.

In step S11, the CPU 10 generates multilayer (eight layers in the present embodiment) shell polygons based on the base polygon data 31 read in step S10, so as to store the multilayer shell polygons as the shell polygon data 33 into the external main memory 12.

In step S12, the CPU 10 reads the base texture image 32 from the external main memory 12.

In step S13, the CPU 10 reads the monochrome shell texture image 34 from the external main memory 12.

In step S14, the CPU 10 blends the monochrome shell texture image 34 read in step S13 with the base texture image 32 read in step S12, so as to store the obtained image as the shell texture image 35 into the external main memory 12. A method for blending may be, for example, a calculation in which each texel of the base texture image 32 is multiplied by the brightness of the corresponding texel of the monochrome shell texture image 34.

The preprocessing as described above may be omitted in a case where the shell polygon data is stored in advance in the optical disc 4 so as to be read, or may be omitted in an embodiment where the shell texture image is stored in advance in the optical disc 4 so as to only be read without being blended.

When the preprocessing as described above is completed, a process shown in the flow chart of FIG. 23 is started in the GPU 11b.

FIG. 23 shows a process (hereinafter, a series of the process shown in FIG. 23 is referred to as an "image drawing process" for convenience) for actually drawing an image using the shell polygon data 33 and the shell texture image 35 generated by the preprocessing, so as to output the image to the display screen and the like. In the present embodiment, the image drawing process is performed in a constant cycle (e.g., on a frame basis) in a repeated manner. Note that the "frame" as used herein refers to a cycle of updating an image, and is typically 1/60 sec. Note, however, that the present invention is not limited thereto, and the image drawing process may be performed only once in order to generate a still image.

Note that although, as shown in the flow chart of FIG. 23, a process (e.g., a process of changing the position of a polygon, changing the position of a light source, and changing the position and the posture of a virtual camera, in accordance with the passage of time) for generating a moving image is not described, the above-described process may be performed for each frame. Further, as described above, a process of changing the distortion map in accordance with the passage of time may be added. Furthermore, a process of changing the number of the layers of the shell polygons, changing the height of each layer of the shell polygons, and the like may be added in accordance with user input or other conditions.

When the image drawing process is started, the GPU 11b first draws the base polygon. Note, however, that it is also possible to present hair by considering the base polygon as one (i.e., the innermost-layer shell polygon) of the multilayer shell polygons so as to draw the base polygon by the same process as that performed for the shell polygons, and thus treating the base polygon as one of the polygons composing the hair. Therefore, the drawing process for the base polygon may be performed in the same manner as that for the shell polygons performed in and after step S24. First, in step S21, the GPU 11b reads the base texture image 32 from the external main memory 12.

Next, in step S22, the GPU 11b texture-maps the base polygon with the base texture image 32 read in step S21.

Then in step S23, the GPU 11b positions the texture-mapped base polygon and draws the positioned base polygon in a frame memory provided within the VRAM 11d.

In steps S24 through S31, all of the eight layers of the shell polygons are texture-mapped in sequential order from the innermost layer.

In step S24, the GPU 11b selects the innermost-layer shell polygon of the shell polygons yet to be texture-mapped.

In step S25, the GPU 11b reads the shell texture image 35 from the external main memory 12.

In step S26, the GPU 11b reads the distortion map 36 from the external main memory 12.

In step S27, in accordance with the height of the layer of the shell polygon to be currently processed, the GPU 11b determines the distortion amount of the layer in a manner shown in FIG. 17.

In step S28, in accordance with the height of the layer of the shell polygon to be currently processed, the GPU 11b determines the transparency of the layer. For example, the transparency is determined such that the greater the height of the layer is, the greater the transparency thereof is. It is preferable that the transparency can be arbitrarily set, in which case a more realistic representation can be performed by setting the transparency in advance such that the further outside the layer is, the greater the transparency thereof is. Accordingly, the transparency may be automatically set such that the further outside the layer is, the greater the transparency thereof is. Although the transparency is determined here, alternatively, not only the transparency but also the brightness of the whole texture may be determined. For example, it is assumed that the further outside the portion is, the brighter the actual hair also is. Thus, the quality of hair can be represented in a more realistic manner by setting the brightness such that the further outside the layer is, the greater the brightness thereof is.

In step S29, in accordance with the distortion amount determined in step S27 and the transparency determined in step S28, the GPU 11b texture-maps the layer of the shell polygon to be currently processed, with the shell texture image 35 read in step S25.

Then in step S30, the GPU 11b positions the texture-mapped shell polygon and draws the positioned shell polygon in the frame memory provided within the VRAM 11d.

In step S31, the GPU 11b determines whether or not all of the shell polygons have been texture-mapped. As a result, the GPU 11b returns to step S24 when a shell polygon yet to be texture-mapped is present, and proceeds to step S32 when all of the shell polygons have been texture-mapped.

In step S32, an image (e.g., the image of the tail shown in FIG. 20) generated as a result of the above steps S23 through S31 is outputted to the TV 2 and the like. That is, images drawn in the frame memory provided within the VRAM 11d are outputted by one frame time via the AV-IC 15 and the AV connector 16.

The process of the above steps S23 through S32 is performed for each frame in a repeated manner.

As described above, according to the present embodiment, each layer of the shell polygons is texture-mapped with the shell texture image 35 which is shared for use among the multilayer shell polygons and is distorted to varying degrees depending on the position of each layer of the shell polygons. Thus, it is possible to display, on the shell polygons, textures different from one another without individually preparing the shell texture image for each layer of the shell polygons.

Further, as shown in FIGS. 17 and 18, the farther the layer of the shell polygon is from the base polygon, the more distorted the shell texture image 35 to be used for texture-mapping the shell polygon is. Thus, it is possible to easily represent the natural appearance of hair which is not straight hair.

Further, the distortion amount of each layer of the shell polygons is automatically determined based on the distortion map 36. Thus, it is possible to reduce the trouble of individually preparing the distortion map for each layer of the shell polygons.

Further, the shell polygons are automatically generated based on the base polygon data 31. Thus, it is possible to reduce the trouble of preparing in advance the shell polygon data 33 corresponding to the multilayer shell polygons.

While the example embodiments presented herein have been described in detail, the foregoing description is in all aspects illustrative and not restrictive. It is to be understood that numerous other modifications and variations can be devised without departing from the scope of the example embodiments.

What is claimed is:

1. A non-transitory computer-readable storage medium having tangibly recorded therein an image processing program for texture-mapping a three-dimensional polygonal model; the image processing program causing a computer to execute:

reading, from storage locations, multilayer polygon data for constructing multilayer shell polygons including multiple layers of polygonal models;

reading, from the storage locations, a shell texture image which is shared for use among the multilayer shell polygons and includes a plurality of areas having transparency different from one another; and texture-mapping each layer of the shell polygons with the shell texture image distorted to varying degrees depending on a position of each layer of the shell polygons, so as to position each layer, wherein each layer of the shell polygons is texture-mapped with the shell texture image distorted by referring to a value of a point shifted from a point to be originally referred to in the shell texture image, wherein the image processing program further causes the computer to execute reading a distortion map indicating a distortion amount of each point of the shell texture image, a distortion amount of each layer of the shell polygons is calculated from the distortion amount indicated by the distortion map, so as to determine, based on the calculation result, the point to be referred to in the shell texture image, and the shell texture image is distorted on a point-by-point basis within each shell polygon according to the distortion map, such that the amount of distortion depends on the particular point.

2. The non-transitory computer-readable storage medium according to claim 1, wherein
the further outside the layer of the shell polygon is, the more distorted the shell texture image is.

3. The non-transitory computer-readable storage medium according to claim 1, wherein
the distortion map includes a horizontal distortion map indicating a distortion amount of the shell texture image in a horizontal direction and also includes a vertical distortion map indicating a distortion amount of the shell texture image in a vertical direction.

4. The non-transitory computer-readable storage medium according to claim 1, wherein
the image processing program further causes the computer to execute reading, from the storage locations, base polygon data for constructing a base polygon to be a base for positioning the multilayer shell polygons, and also to execute positioning the base polygon based on the read base polygon data, and
based on a distance between the base polygon and each layer of the shell polygons, the distortion amount of each layer of the shell polygons is calculated from the distortion amount indicated by the distortion map, so as to position the multilayer shell polygons outside the base polygon.

5. The non-transitory computer-readable storage medium according to claim 1, wherein
based on sequential order, starting from an innermost layer, in which the shell polygons are positioned, the distortion amount of each layer of the shell polygons is calculated from the distortion amount indicated by the distortion map.

6. The non-transitory computer-readable storage medium according to claim 1, wherein
the distortion amount of each layer of the shell polygons is further changed with respect to a unit of time.

7. The non-transitory computer-readable storage medium according to claim 1, wherein
the image processing program further causes the computer to execute reading, from the storage locations, base polygon data for constructing a base polygon to be a base for positioning the multilayer shell polygons, and also to execute positioning the base polygon based on the read base polygon data, and
the multilayer shell polygons are positioned outside the base polygon.

8. The non-transitory computer-readable storage medium according to claim 7, wherein
the image processing program further causes the computer to execute texture-mapping the base polygon with a base texture image used for the base polygon.

9. The non-transitory computer-readable storage medium according to claim 7, wherein
the image processing program further causes the computer to execute generating, based on the base polygon data, new vertices by shifting vertices of the base polygon by predetermined distances in normal vector directions, so as to generate the multilayer polygon data based on the generated vertices.

10. The non-transitory computer-readable storage medium according to claim 1, wherein
the further outside the layer of the shell polygon is, the greater the transparency of the shell texture image to be used for texture-mapping the shell polygon is.

11. The non-transitory computer-readable storage medium according to claim 1, wherein
the multilayer shell polygons are positioned based on the multilayer polygon data prepared in advance.

12. An image processing apparatus for texture-mapping a three-dimensional polygonal model comprising a computer processor configured to:
read, from storage locations, multilayer polygon data for constructing multilayer shell polygons including multiple layers of polygonal models;
read, from the storage locations, a shell texture image which is shared for use among the multilayer shell polygons and includes a plurality of areas having transparency different from one another; and
texture-map each layer of the shell polygons with the shell texture image distorted to varying degrees depending on a position of each layer of the shell polygons, so as to position each layer, wherein
each layer of the shell polygons is texture-mapped with the shell texture image distorted by referring to a value of a point shifted from a point to be originally referred to in the shell texture image, wherein
the computer processor is configured to further read a distortion map indicating a distortion amount of each point of the shell texture image,
calculate a distortion amount of each layer of the shell polygons from the distortion amount indicated by the distortion map, so as to determine, based on the calculation result, the point to be referred to in the shell texture image, and
the shell texture image is distorted on a point-by-point basis within each shell polygon according to the distortion map, such that the amount of distortion depends on the particular point.

13. The image processing apparatus according to claim 12, wherein
the further outside the layer of the shell polygon is, the more distorted the shell texture image is.

* * * * *